US010530858B1

(12) United States Patent
Parulkar et al.

(10) Patent No.: US 10,530,858 B1
(45) Date of Patent: Jan. 7, 2020

(54) REPLICATION OF CONTENT USING DISTRIBUTED EDGE CACHE IN WIRELESS MESH NETWORKS

(71) Applicant: Amazon Technologies, Inc., Seattle, WA (US)

(72) Inventors: Ishwardutt Parulkar, San Francisco, CA (US); Jayashree Subramanian, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 188 days.

(21) Appl. No.: 15/863,588

(22) Filed: Jan. 5, 2018

(51) Int. Cl.
*G06F 15/16* (2006.01)
*H04L 29/08* (2006.01)
*G06F 16/27* (2019.01)
*G06F 16/178* (2019.01)
*H04W 84/18* (2009.01)

(52) U.S. Cl.
CPC ........ *H04L 67/1095* (2013.01); *G06F 16/178* (2019.01); *G06F 16/27* (2019.01); *H04L 67/1097* (2013.01); *H04W 84/18* (2013.01)

(58) Field of Classification Search
CPC ...................................................... G06F 16/27
USPC ......................................................... 709/218
See application file for complete search history.

(56) References Cited

U.S. PATENT DOCUMENTS

| 7,783,786 | B1* | 8/2010 | Lauterbach | ......... H04L 67/1095 |
| | | | | 709/238 |
| 2004/0010510 | A1* | 1/2004 | Hotti | ....................... G06F 16/27 |
| 2005/0015404 | A1* | 1/2005 | Cherkasova | ........ H04L 67/1095 |
| 2011/0016227 | A1* | 1/2011 | Feng | ................... H04W 40/248 |
| | | | | 709/245 |
| 2013/0103585 | A1* | 4/2013 | Carapelli | ............. G06Q 20/202 |
| | | | | 705/44 |
| 2014/0164315 | A1* | 6/2014 | Golshan | ................ H04L 65/403 |
| | | | | 707/608 |
| 2016/0132578 | A1* | 5/2016 | Allen | ...................... G06F 16/27 |
| | | | | 709/203 |

OTHER PUBLICATIONS

John Lamping, Eric Veach, Google, "A Fast, Minimal Memory, Consistent Hash Algorithm", https://arxiv.org/ftp/arxiv/papers/1406/1406.2294.pdf, Jun. 9, 2014, 12 pages.

(Continued)

*Primary Examiner* — Anthony Mejia
(74) *Attorney, Agent, or Firm* — Lowenstein Sandler LLP

(57) ABSTRACT

A computer system comprises a memory to store instructions and a processor to: generate a list comprising a first entry including an identifier of a first mesh device and a number of neighboring devices that are reachable by the first mesh device over a single-hop path, and a second entry including an identifier of a second mesh device and a number of neighboring devices that are reachable by the second mesh device over a single-hop path; order the initial list in a descending order of the numbers of neighboring devices; determine a replication factor for the digital content item; identify a subset of entries of the ordered list, wherein a number of entries comprised by the subset is equal to the replication factor; and cause a first copy of the digital content item to be stored on the mesh device referenced by the first entry.

20 Claims, 12 Drawing Sheets

(56) References Cited

OTHER PUBLICATIONS

Chapter 11, 802.11r, 802.11k, 802.11v, 802.1w Fast Transition Roaming, 28 pages, Dec. 7, 2016.
IEEE Std 802.11-2016, IEEE Standard for Information Technology—Local and Metropolitan Area Networks—Specific Requirements, Part 11: Wireless LAN MAC and PHY Specifications, pp. 205-209, 496-507, 520-527, 1024-1032, 1047, 1247-1259, 1404-1414, 1493-1499, 1659, 2084, 2132-2224, 2749, 3510-3517, Jul. 11, 2017.

* cited by examiner

REPLICATION OF CONTENT USING DISTRIBUTED EDGE CACHE IN WIRELESS MESH NETWORKS

BACKGROUND

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The examples described herein will be understood more fully from the detailed description given below and from the accompanying drawings, which, however, should not be taken to limit the application to the specific examples, but are for explanation and understanding only.

DETAILED DESCRIPTION

Figure 1:
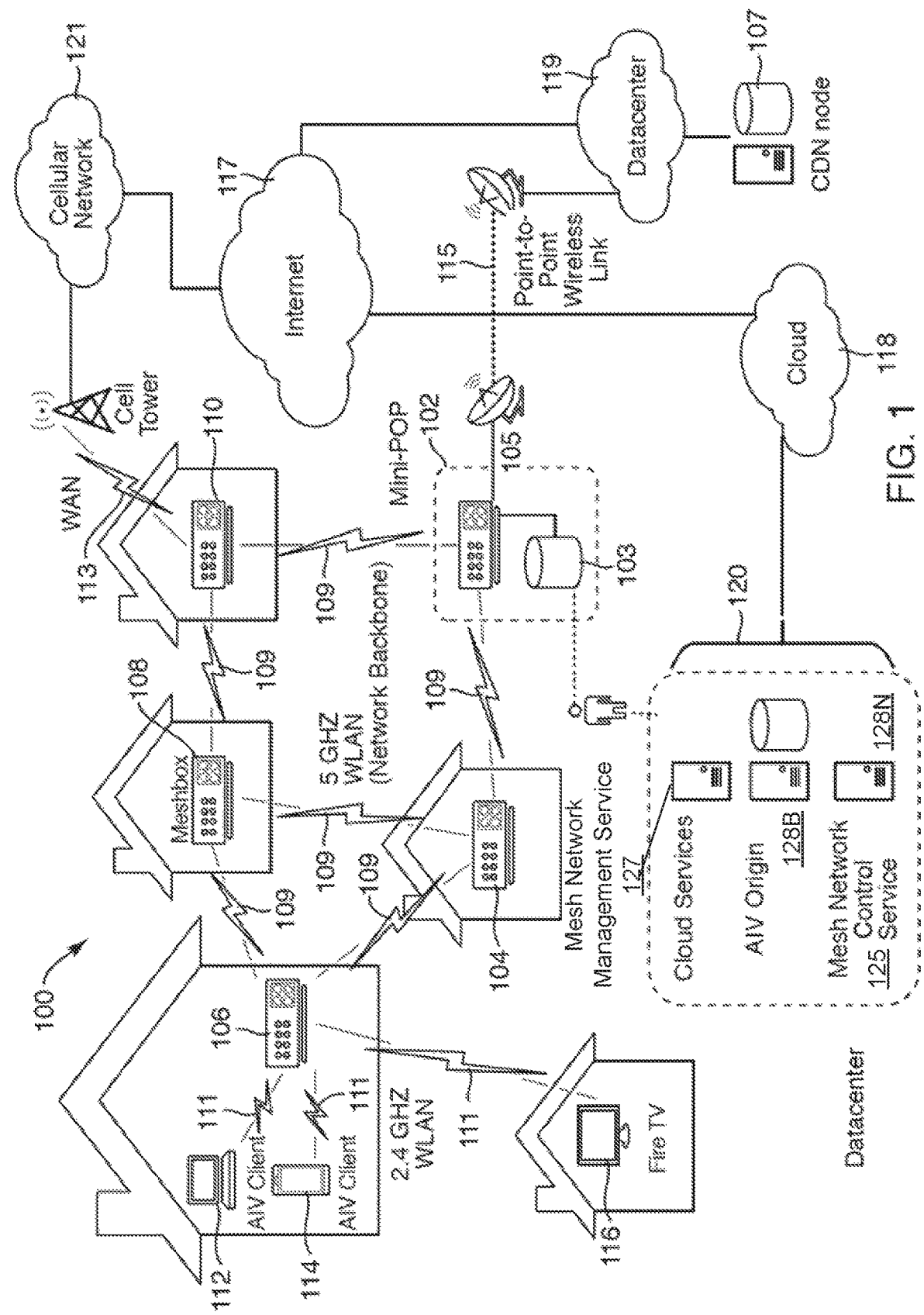
FIG. 1 is a component diagram illustrating hardware devices organized in a wireless mesh network.

Described herein are systems and methods for content replication and caching by wireless mesh networks.

Nodes of a mesh network may establish peer-to-peer wireless links for transmitting messages to each other. In particular, messages may be transferred, through other nodes, between the source and destination nodes that are not in direct communication with each other. In an illustrative example, a mesh network may be employed for digital content distribution to client network devices in an environment of limited connectivity to broadband Internet infrastructure. The digital content may include video and/or audio files. A subset of digital content files may be replicated by one or more content serving nodes, which may be located outside of the wireless network (content distribution network (CDN) nodes) and/or within the wireless network (content replicating nodes). "Digital content item" herein refers to at least a part of a digital content file.

A client network device may connect to one of the network nodes and request a particular digital content item. The content retrieval latency, content play-back quality and/or other parameters determining the user's experience may be affected by several factors, including the throughput of the network path between the client device and the content storing node, the number of hops on the network path, the latency of digital content item delivery over the network path, and the congestion of one or more links comprised by the network path.

In order to improve the overall efficiency of content distribution by the wireless mesh network, at least a subset of digital content items may be replicated by one or more network nodes. Content replication may reduce the number of hops between a requesting client device and a network node that stores the requested digital content item, thus reducing the latency of the digital content item delivery to the requesting client device. Content replication may also reduce network link congestion on network paths to certain network nodes that could otherwise be caused by multiple clients attempting to simultaneously access those network nodes. Accordingly, content replication may result in minimizing the digital content item look-up time, minimizing the digital content item retrieval time, minimizing the amount of network traffic caused by content retrieval operations, equalizing the load distribution across the network nodes, and/or minimizing overhead caused by content movement between the network nodes.

In order to improve the overall efficiency of content distribution by the wireless mesh network, at least a subset of digital content items may be replicated by one or more network nodes using various content replication strategies. Since the storage capacity of a network node is limited, the trivial solution of storing all content items on all nodes may be impractical. Accordingly, a content replication strategy may be employed to identify the subset of content items to be replicated and determine their allocation to network nodes. The total number of copies of a given digital content item to be stored on the network nodes (also referred to herein as the "replication factor" of the digital content item) may be measured as a function of the content item popularity. In one embodiment, the content replication strategy may be implemented by a centralized network management service, such as mesh network control service.

In one embodiment, the content replication strategy may involve storing a given digital content item on a network node whose identifier is determined by hashing the identifier of the digital content item using a certain hashing scheme. The content replication strategy may further involve storing the digital content item on one or more network nodes whose reachability by client network devices is proportional to the popularity of the digital content item, such that more popular content items are stored on network nodes that are potentially reachable by larger number of client network devices, while less popular content items are stored on network nodes that are potentially reachable by smaller number of client network devices, as described in more detail herein below.

In wireless mesh networks, the throughput, latency, and/or other characteristics of a network path between the client device and the content serving node may fluctuate significantly, e.g., due to the network congestion caused by varying number of client network devices utilizing the same network links. In order to improve the user's experience in consuming the digital content, a wireless mesh network may implement a content caching strategy, according to which the same digital content (e.g., video content) may be made available to client network devices in multiple resolutions and bit rates. For a given digital content item, one or more primary copies and one or more backup copies may be stored by the network nodes. The primary copy may be encoded using the higher resolution and/or higher bit rate than the backup copies.

Accordingly, in one embodiment, the network node to which the client device is connected may, responsive to receiving a content request from the client device, select one of the primary and backup copies for streaming to the client device. The network node may later switch to another copy based on the current and/or predicted network parameters, such as the throughput, latency, and/or other characteristics of the network path between the client device and the content serving node. In another embodiment, the mesh network management service may monitor the network path parameters and may instruct the requesting client to switch from one copy to another responsive to detecting a change in the network parameters.

Various aspects of the above referenced methods and systems are described in detail herein below by way of example, rather than by way of limitation.

FIG. 1 is a component diagram illustrating hardware devices organized in a wireless mesh network. As illustrated by FIG. 1, hardware devices 102-110 may be organized in a mesh network 100, for content distribution to client devices in an environment of limited connectivity to broadband Internet infrastructure in order to transfer digital content to one or more client consumption devices. In the depicted embodiment, the mesh network 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). In one embodiment, the mini-pop device 102 may be equipped with a local storage which may be employed for storing a most popular subset of the content retrieved from the CDN server for serving to the client consumption devices 112, 114, 116. The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being an ingress device to the mesh network 100.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the mesh network 100 for the content files stored in the mesh network 100. Meaning the mini-POP 102 may be the only node in the mesh network 100 having access to the attached storage and/or a communication channel to retrieve content files stored outside of the mesh network 100. In other embodiments, multiple mini-POP devices may be deployed in the mesh network 100, but the number of mini-POP devices should be much smaller than a total number of network hardware devices in the mesh network 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the mesh network 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the mesh network 100. In some cases, the mini-POP device 102 does not have an Internet connection via the point-to-point wireless connection 105 and the content is stored only in the attached storage device 103 for a self-contained mesh network 100. In such cases, the content stored on the attached storage device may from time to time be refreshed, e.g., by utilizing a removable storage device and/or by other suitable methods.

The mesh network 100 also includes multiple mesh nodes 104, 106, 108, and 110 which may establish multiple P2P wireless connections 109 among themselves in order to form a network backbone. It should be noted that only some of the possible P2P wireless connections 109 are shown between the mesh nodes 104, 106, 108, and 110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104, 106, 108, and 110 (and the mini-POP device 102) may be provided by multi-channel (MRMC) network devices. As described herein, the mesh nodes 104, 106, 108, and 110 do not necessarily have reliable access to the CDN device 107. The mesh nodes 104, 106, 108, and 110 (and the mini-POP device 102) wirelessly communicate with other nodes via the network backbone via a first set of WLAN channels reserved for inter-node communications. The mesh nodes 104, 106, 108, and 110 communicate data with one another via the first set of WLAN channels at a first frequency of approximately 5 GHz (e.g., 5 GHz band of the Wi-Fi® network technologies).

Each of the mesh nodes 104, 106, 108, and 110 (and the mini-POP device 102) also includes multiple node-to-client (N2C) wireless connections 111 to wirelessly communicate with one or more client consumption devices via a second set of WLAN channels reserved for serving content files to client consumption devices connected to the mesh network 100. In particular, the second mesh node 106 is wirelessly coupled to a first client consumption device 112 (Amazon Instant Video (AIV) client) via a first N2C wireless connection 111, a second client consumption device 114 (AIV client) via a second N2C wireless connection 111, and a third client consumption device 116 (e.g., the Fire TV device) via a third N2C wireless connection 111. The second mesh node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104, 106, 108, and 110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be application programming interfaces (APIs) provided for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the mesh network 100 remotely. Also, the cellular connection 113 may aid in the debugging and optimization of the mesh network 100. In other embodiments, other low bandwidth services may also be offered through this link (e.g. email, shopping on Amazon.com, or the like).

Although only four mesh nodes 104, 106, 108, and 110 are illustrated in FIG. 1, the mesh network 100 can use many mesh nodes, wireless connected together in a mesh network, to move content through the mesh network 100. The 5 GHz WLAN channels are reserved for inter-node communications (i.e., the network backbone). Theoretically, there is no limit to the number of links a given mesh node can have to its neighbor nodes. However, practical considerations, including memory, routing complexity, physical radio resources, and link bandwidth requirements, may place a limit on the number of links maintained to neighboring mesh nodes. Mesh nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each mesh node can support depends on a number of factors including memory, bandwidth requirements of the client, incoming bandwidth that the mesh node can support, and the like. For example, the mesh nodes provide coverage to users who subscribe to the content delivery service and consume that service through an AIV client on the client consumption devices (e.g., a mobile phone, a set top box, a tablet, or the like). It should be noted that there is a 1-to-many relationship between mesh nodes and households (not just between nodes and clients). This means the service can be provided without necessarily requiring a customer to have a mesh node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The mesh nodes can be located in various structures, and there can be multiple mesh nodes in a single structure.

The mesh network 100 may be used to accomplish various tasks, including moving high bandwidth content to users and storing that content in the network itself. The content moving task may be performed by hardware using the radio links between mesh nodes and the radio links between mesh nodes and client consumption devices, and by software using the routing protocols used to decide where to push traffic and link and channel management used to configure the mesh network 100. The content storing task may be performed using caches of content close to the user. An example content delivery network (CDN) implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the mesh network 100 includes the mini-POP device 102 that is designed to handle smaller amounts of traffic than a typical POP rack. Architecturally, the mini-POP device 102 may be designed as a mesh node with storage attached (e.g. external hard disk). The mini-POP device 102 may function identically to a POP device with the exception of how cache misses are handled. Because of the lack of broadband Internet infrastructure, the mini-POP device 102 may have no traditional Internet connection to the next level of cache. Therefore, in one embodiment, the mini-POP device 102 may have a network connection (not necessarily an Internet connection) to handle the cache misses. In another embodiment, the mini-POP device may have no such a network connection and thus may not be capable of handling the cache misses.

The mesh network 100 may be considered a multi-radio multi-channel (MRMC) mesh network. MRMC mesh networks are an evolution of traditional single radio mesh networks and a leading contender for combatting the radio resource contention that has plagued single radio mesh networks and prevents them from scaling to any significant size. The mesh network 100 has multiple devices, each with multi-radio multi-channel (MRMC) radios. The multiple radios for P2P connections and N2C connections of the network devices allow the mesh network 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. A "hop" as used herein may refer to a portion of a network path between two neighboring nodes.

The mesh network 100 can provide adequate bandwidth, especially node-to-node bandwidth. For video, content delivery services recommend a minimum of 1.9 Mbps for standard definition content and 3.5 Mbps for high definition content. The mesh network 100 can provide higher bandwidths than those recommended for standard definition and high definition content.

In some embodiments, the mesh network 100 can be self-contained as described herein. The mesh network 100 may be self-contained in the sense that content resides in, travels through, and is consumed by nodes in the mesh network without requiring the content to be fetched outside of the mesh network 100. In other embodiments, the mesh network 100 can have mechanisms for content injection and distribution. One or more of the services 120 can manage the setup of content injection and distribution. These services (e.g., the mesh network control service 125 and/or the mesh network management service 127) can be hosted by as cloud services, and may be executed by one or more computer systems 128A-128N, which may include servers and/or virtual machines. The mechanisms implemented by these services can be used for injecting content into the network as new content is created or as user viewing preferences change. In one embodiment, the content can be injected into the mesh network 100 via the point-to-point wireless connection 105 or the HITL process at the mini-POP device 102. In one embodiment, the mesh network control service 125 may include a content replication engine implementing the content replication methods described herein.

In some embodiments, prior to consumption by a node having an AIV client itself or being wirelessly connected to an AIV client executing on a client consumption device, the content may be pulled close to that node. This may involve implementing various replication and caching strategies based on predicting when content will be consumed to proactively move it closer and/or always having it close.

The mesh network 100 can provide some fault tolerance so that a single mesh node becoming unavailable for failure or reboot has minimal impact on availability of content to other users. The mesh network 100 can be deployed in an unpredictable environment. Radio conditions may not be constant and sudden losses of power may occur. The mesh network 100 is designed to be robust to temporary failures of individual nodes. The mesh network 100 can be designed to identify those failures and adapt to these failures once identified. Additionally, the mesh network 100 can include mechanisms to provide secure storage of the content that resides within the mesh network 100 and prevent unauthorized access to that content.

The cloud services 120 of the mesh network 100 can include mechanisms to deal with mesh nodes that become unavailable, adding, removing, or modifying existing mesh nodes in the mesh network 100. The cloud services 120 may also include mechanisms for remote health and management. For example, there may be a remote health interface, a management interface, or both to access the mesh nodes for this purpose. The cloud services 120 can also include mechanisms for securing the mesh network 100 and the content that resides in the mesh network 100. For example, the cloud services 120 can control device access, digital rights management (DRM), and node authentication.

Other use cases of mesh networks operating in accordance with embodiments of the present disclosure include employing mesh networks for residential, office, campus/community and public safety uses. In one example, mesh networks described herein may be employed to eliminate radio frequency dead spots and areas of low-quality wireless coverage in private residences or public spaces. In another example, mesh networks described herein may be employed to provide network access to emergency and safety personnel such as fire, police, and emergency medical technicians responding to an incident scene. Possible use cases of mesh networks operating in accordance the embodiments of the present disclosure are not limited to the above-described examples.

Figure 2:
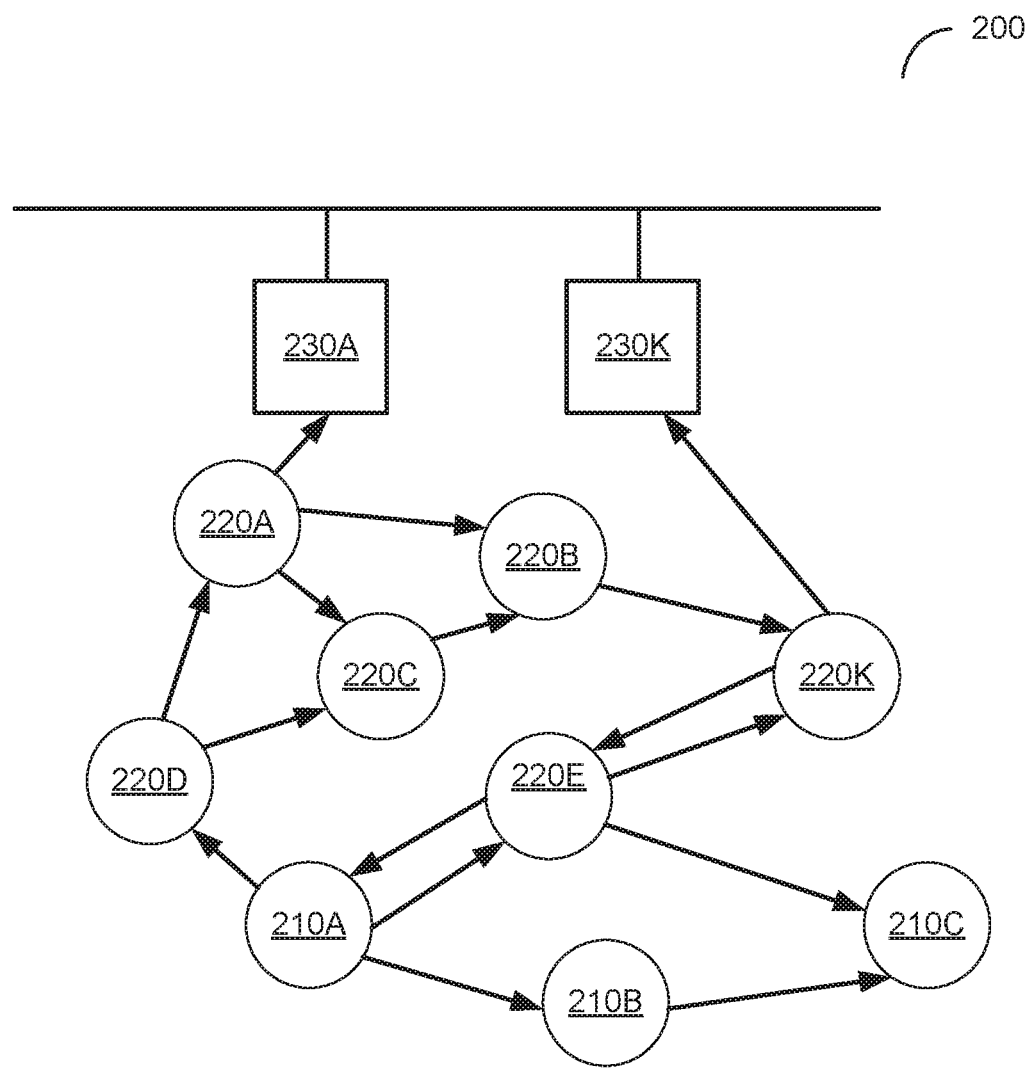
FIG. 2 is a functional network diagram of an illustrative example of a wireless mesh network operating in accordance with embodiments of the present disclosure.

FIG. 2 is a functional network diagram of an illustrative example of a wireless mesh network operating in accordance with embodiments of the present disclosure. In one embodiment, each of the network devices of wireless mesh network 100 of FIG. 1 may implement functions of one or more functional components of FIG. 2. In other embodiments, various other wireless mesh networks may include hardware and/or software components which may implement functions of one or more functional components of FIG. 2.

As schematically illustrated by FIG. 2, an example wireless mesh network 200 may include a plurality of mesh network nodes including communication devices that implement the functions of wireless mesh point stations (MP STA) 210A-210Z, mesh access points (MAP) 220A-220K, and mesh portals (MPP) 230A-220M. In one embodiment, the wireless mesh network 200 may be compliant with IEEE802.11s protocol, which supports broadcast/multicast and unicast delivery using radio-aware path selection metrics over self-configuring multi-hop topologies.

A wireless mesh point station may be provided by a communication device that includes hardware and/or software for implementing Medium Access Control (MAC) and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal, also referred to as a network ingress device, is a wireless access point that provides distribution and integration services (i.e., MSDU translation to another network format and MSDU forwarding to a wireless or wired destination), e.g., by one or more wireline or wireless connections to a backbone network.

Figure 3:
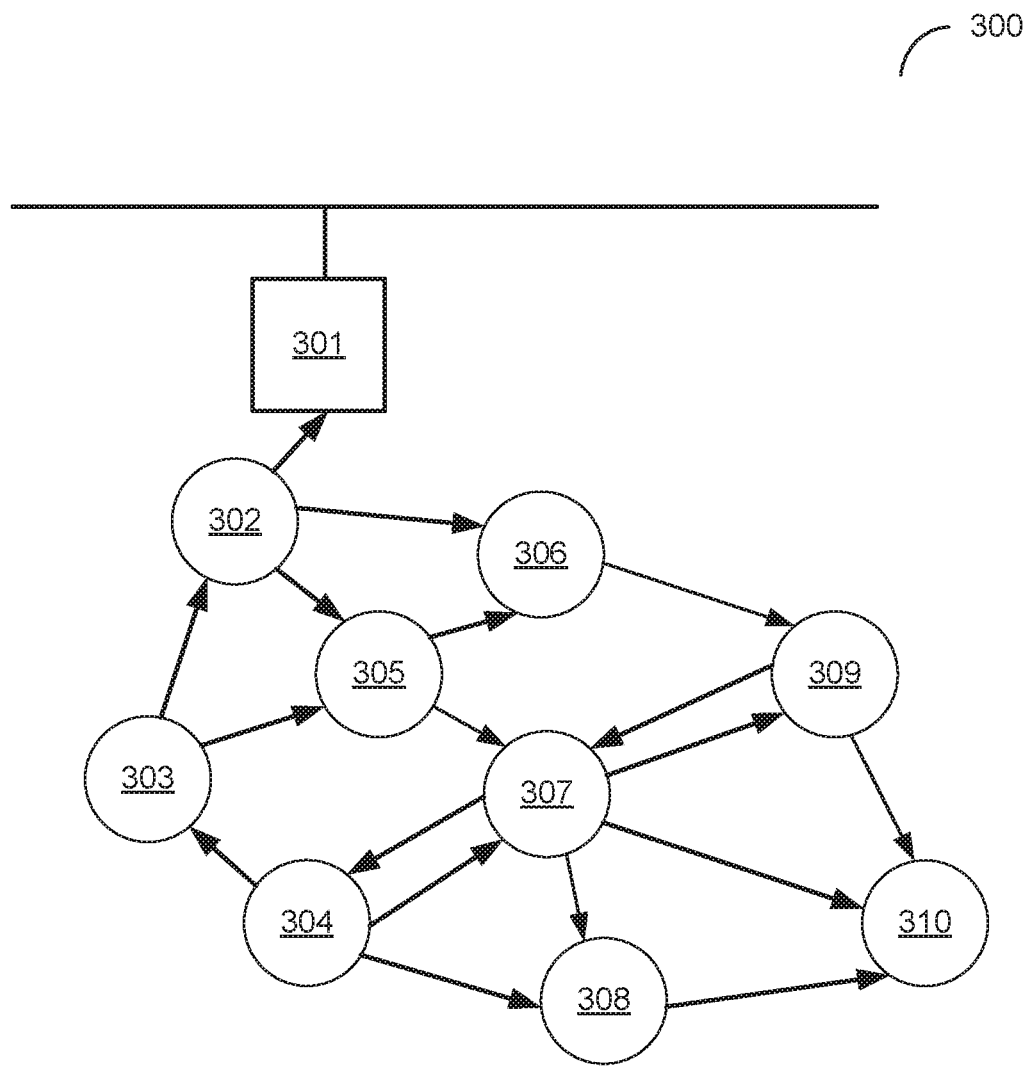
FIG. 3 schematically illustrates one embodiment of a path selection method implemented by a wireless mesh network operating in accordance with embodiments of the present disclosure.

FIG. 3 schematically illustrates one embodiment of a path selection method implemented by a wireless mesh network operating in accordance with embodiments of the present disclosure. As shown in FIG. 3, the wireless mesh network 300 may include nodes 301-310. The source node 304 may employ the dynamic path selection mode to find a path to the destination node 310. In an illustrative example, the source node may broadcast a network management frame including a route request (RREQ) information element specifying the destination node (e.g., using the MAC address of the destination node 310) and initializing the metric field to zero. Responsive to receiving a RREQ, an intermediate node (e.g., a node 307, 308, or 309) may increment the metric field of the RREQ to reflect the airtime of the last hop leading to this node. The intermediate node may then create a route to the source node 304 or update an existing route to the source node, and re-broadcast the RREQ by forwarding it to its neighboring nodes. Thus, whenever an intermediate node forwards a RREQ, the metric field in the RREQ will be updated to reflect the cumulative metric of the route to the source of the RREQ.

Responsive to receiving a RREQ, the destination node 310 may increment the metric field of the RREQ to reflect the airtime of the last hop leading to the destination node. The destination node may then select, among a plurality of candidate network paths between the source node 304 and the destination node 310, the network path having a minimal value of the network path selection metric.

Responsive to receiving a network management frame including the RREP information element specifying the destination, an intermediate node (e.g., a node 307, 308, or 309) may create or update a route to the destination node 310 and forward the RREP towards the source node 304. Upon receiving the RREP, the source node 304 may create a route to the destination node 310. Upon receiving further RREQs specifying the same source node with a metric value better than the existing route, the destination node may update its route to the source node and send a new RREP to the source node along the updated route. Participating network nodes may store the created and/or updated routes in their respective routing tables.

As noted herein above, mesh network devices, also referred to herein as "network nodes," may establish peer-to-peer wireless links and transmit messages to each other. In particular, messages may be transferred, through other nodes, between two nodes that are not in direct communication with each other. In an illustrative example, a wireless mesh network may be employed for digital content distribution to client network devices in an environment of limited connectivity to broadband Internet infrastructure.

In order to improve the overall efficiency of content distribution by the wireless mesh network, at least a subset of digital content items may be replicated by one or more network nodes using various content replication strategies. A content replication strategy may identify the subset of content items to be replicated and determine their allocation to network nodes. In one embodiment, the content replication strategy may be implemented by a centralized network management service, such as mesh network control service 125 of FIG. 1.

In one embodiment, the content replication strategy may take into account the client demand for content. In certain implementations, client requests for digital content may follow a Zipf's distribution, such that the majority of requests are directed to a relatively small subset of content. For example, client devices located in a certain residential area may generate a significant number of requests to digital content in a particular language. Accordingly, analyzing and understanding the demand patterns may help storing the content closer to the network nodes which are more likely to request it. Goals of the content replication strategy may include determining content placement on the network nodes that would provide high-availability content delivery with no single point of failure and high performance content delivery (e.g., measured by the content lookup and retrieval time).

In one embodiment, the content replication strategy may include Level 1 content replication strategy, which defines the placement of one copy of a given digital content item, and may further include Level 2 content replication strategy, which defines the placement on the network nodes of the second and subsequent copies of at least a subset of digital content items which have been replicated by Level 1 content replication.

In one embodiment, the total number of copies of a given digital content item to be stored on the network nodes (also referred to herein as the "replication factor" of the digital content item) may be measured as a function of the content item popularity, which, in turn, may be represented by the ratio of the number of actual or simulated requests for the digital content item and the number of actual or simulated requests for at least a subset of digital content items stored in the wireless mesh network:

$$RF_i = F(R_i/R_T),$$

where $RF_i$ denotes the replication factor for digital content item i, $R_i$ denotes the actual or simulated number of client requests for the digital content item over a period of time, $R_T$ denotes the actual or simulated total number of client requests for digital content items over the period of time, F denotes the content popularity transformation, which may be represented by a linear function, resulting in $RF_C = k*(R_i/R_T)$, where k is a positive real number. The coefficient k may be determined, e.g., by analyzing actual or simulated values of one or more metrics characterizing the content replication efficiency. Accordingly, the value of coefficient k and/or other content replication parameters may be chosen such that the content replication strategy that applies the chosen parameter values would minimize the actual or simulated digital content item look-up time, minimize the actual or simulated digital content item retrieval time, minimize the actual or simulated amount of network traffic caused by content retrieval operations, maximize the actual or simulated total number of distinct digital content items replicated by the network, equalize the actual or simulated load distribution across the network nodes, and/or minimize the actual or simulated overhead caused by content movement between the network nodes. In one embodiment, the coefficient k may also depend on the total amount of distributed storage available on the mesh network devices: the larger the amount of available storage, the greater is the value of coefficient k. The dependency of coefficient k on the total amount of available distributed storage may be expressed by a linear or a non-linear function.

Figure 4:
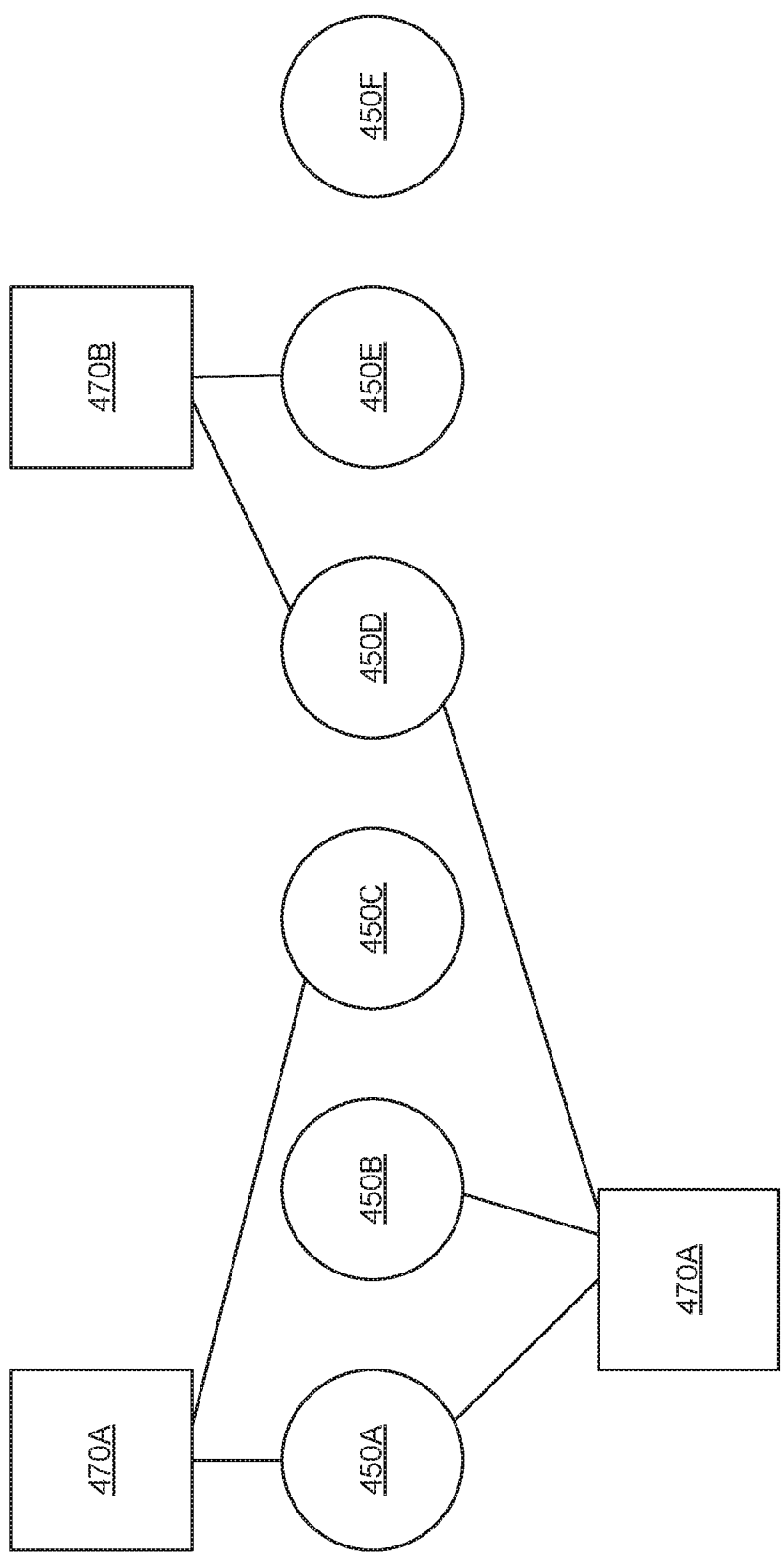
FIG. 4 schematically illustrates an example of assigning digital content items to nodes of a wireless mesh network, in accordance with embodiments of the present disclosure.

In one embodiment, Level 1 content replication strategy may define the placement of the first copy of a digital content item, while Level 2 content replication strategy may define the placement of further copies of the digital content items whose replication factor RF exceeds or is equal to two (RF>=2). FIG. 4 schematically illustrates an example of assigning digital content items to nodes of a wireless mesh network, in accordance with embodiments of the present disclosure. The wireless mesh network 400 includes network nodes 450A-450N storing copies of digital content items 470A-470K. In particular, the digital content item 470A is stored by nodes 450A and 450C, the digital content item 470B is stored by nodes 450D and 450E, and the digital content item 470C is stored by nodes 450A, 450B, and 450D.

Since the storage capacity of a network node is limited, the trivial solution of storing all content items on all nodes may be impractical. Accordingly, the Level 1 content replication strategy may in one embodiment maximize the total number of distinct digital content items stored by the network, in order to equalize the load distribution across the nodes (or, in other words, minimize the difference in load distribution across the network nodes).

In one embodiment, the mesh network control service may implement Level 1 content replication by storing a given digital content item on a network node whose identifier is determined by hashing the identifier of the digital content item using a certain hashing scheme (e.g., the jump consistent hashing):

$$n = H(K_i, N),$$

where H denotes the hash function, which may be represented by an irreversible transformation which maps a key $K_i$ represented by the identifier of the digital content item i to a hash value representing the identifier of the network node on which the digital content item should be stored (provided by a positive integer n from a pre-determined range), such that two different keys are unlikely to produce the same hash value, and N denotes the number of nodes in the wireless mesh network.

In one embodiment, the content item identifier to be fed to the hash function H may be provided by an arbitrary alphanumeric string, which may be truncated in order to fit the pre-defined size of the hash function input key.

Figure 6:
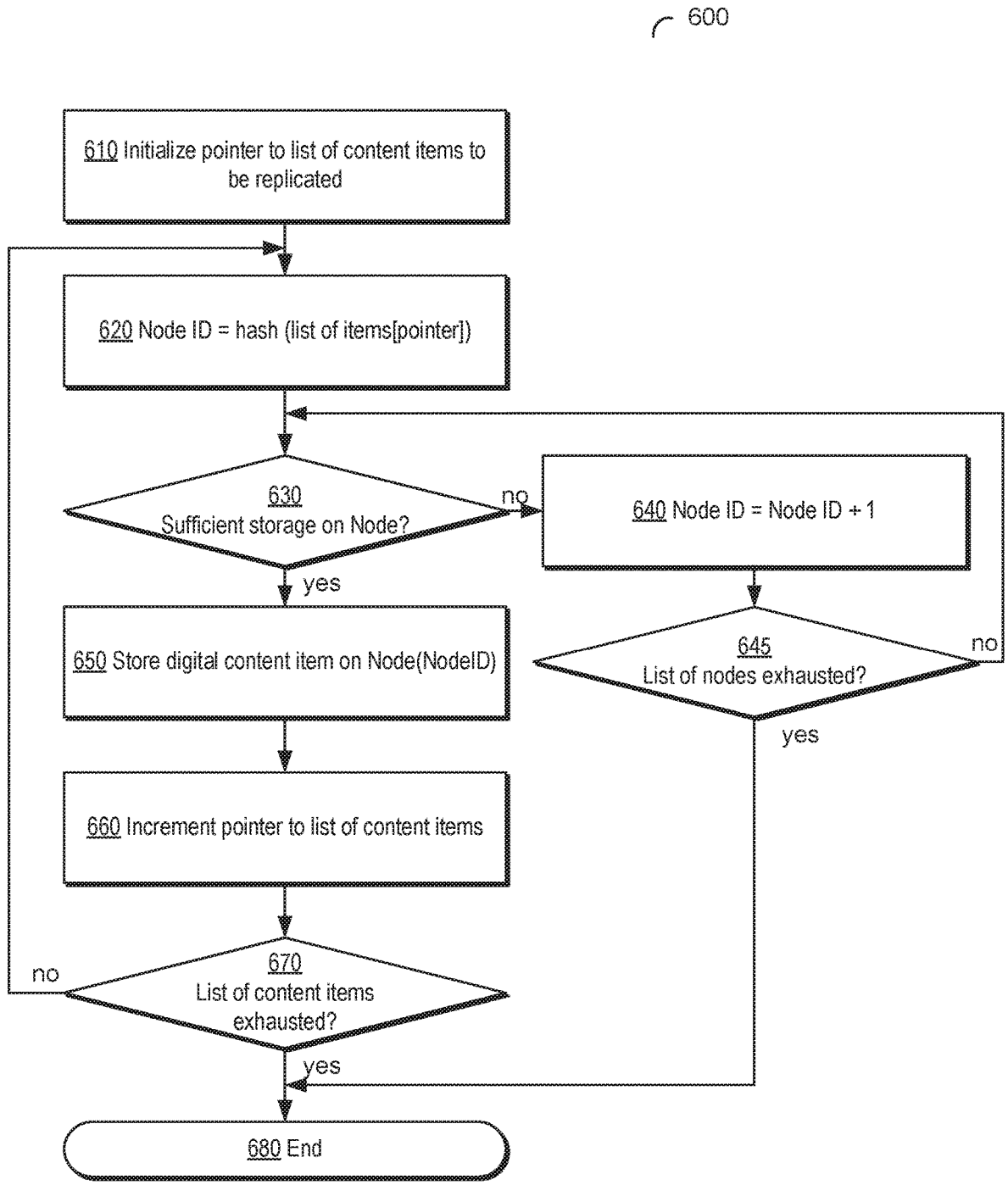
FIG. 6 is a flow diagram of one embodiment of a method of Level 1 content replication, in accordance with embodiments of the present disclosure.

In one embodiment, if the network node identified by the node identifier produced by hashing the digital content identifier does not have an amount of available storage that would be sufficient for storing the digital content item, the node identifier iteratively be incremented by a pre-determined increment value (e.g., 1) until a node having sufficient storage capacity is found or it is established that none of the nodes has sufficient storage capacity, as described in more detail herein below with reference to FIG. 6.

In one embodiment, the hash function may be represented by the jump consistent hash function which inputs a key (i.e., the digital content item identifier) and a number of network nodes, and returns the identifier of one of the network nodes. The jump consistent hash function produces relatively even content distribution across the network nodes, such that the numbers of content items assigned to each network node would fall within a certain relatively small range. Furthermore, the content identifier to node identifier mapping is not changed significantly when the number of nodes changes, thus minimizing the amount of data that needs to be moved across the network in response to adding new network nodes or removing existing network nodes.

Example C++ code fragment implementing the jump consistent hash function by John Lamping and Eric Veach is reproduced herein:

```
int32_t JumpConsistentHash(uint64_t key, int32_t num_buckets) {
  int64_t b=1,
  j=0;
  while (j<num_buckets)
  b=j;
  key=key*2862933555777941757ULL+1;
  j=(b+1)*(double(1LL<<31)/double((key>>33)+1));
  }
  return b;
}
```

The function inputs a 64-bit key and the number of buckets (i.e., network nodes) and outputs a bucket number in the range [0, N), where N denotes the number of nodes in the wireless mesh network.

In order to identify a node which stores a copy of a particular digital content item in a network implementing the above-described Level 1 replication strategy, the network node servicing the request from a client consumption device may calculate a hash function of the digital content item identifier, and may transmit a content request to the network node identified by the hash value. Thus, the content lookup involves no broadcast requests and thus produces no significant overhead traffic in the wireless mesh network.

In one embodiment, the mesh network control service may implement Level 2 content replication by identifying, for storing a given digital content item, one or more network nodes whose reachability by client network devices is proportional to the popularity of the digital content item, such that more popular content items are stored on network nodes that are potentially reachable by larger number of client network devices, while less popular content items are stored on network nodes that are potentially reachable by smaller number of client network devices.

In one embodiment, reachability of a given network node by client network devices may be characterized by the node connectivity indicator, which may be represented by the number of single-hop neighboring network nodes of the given node, i.e., the number of network nodes which may be reachable by the given network node over a single-hop network path.

Accordingly, the mesh network control service may implement Level 2 content replication by creating a node connectivity list, such that each entry of the list stores a mapping of a node identifier to the node connectivity indicator:

<Node ID, Node Connectivity Indicator>.

Figure 5:
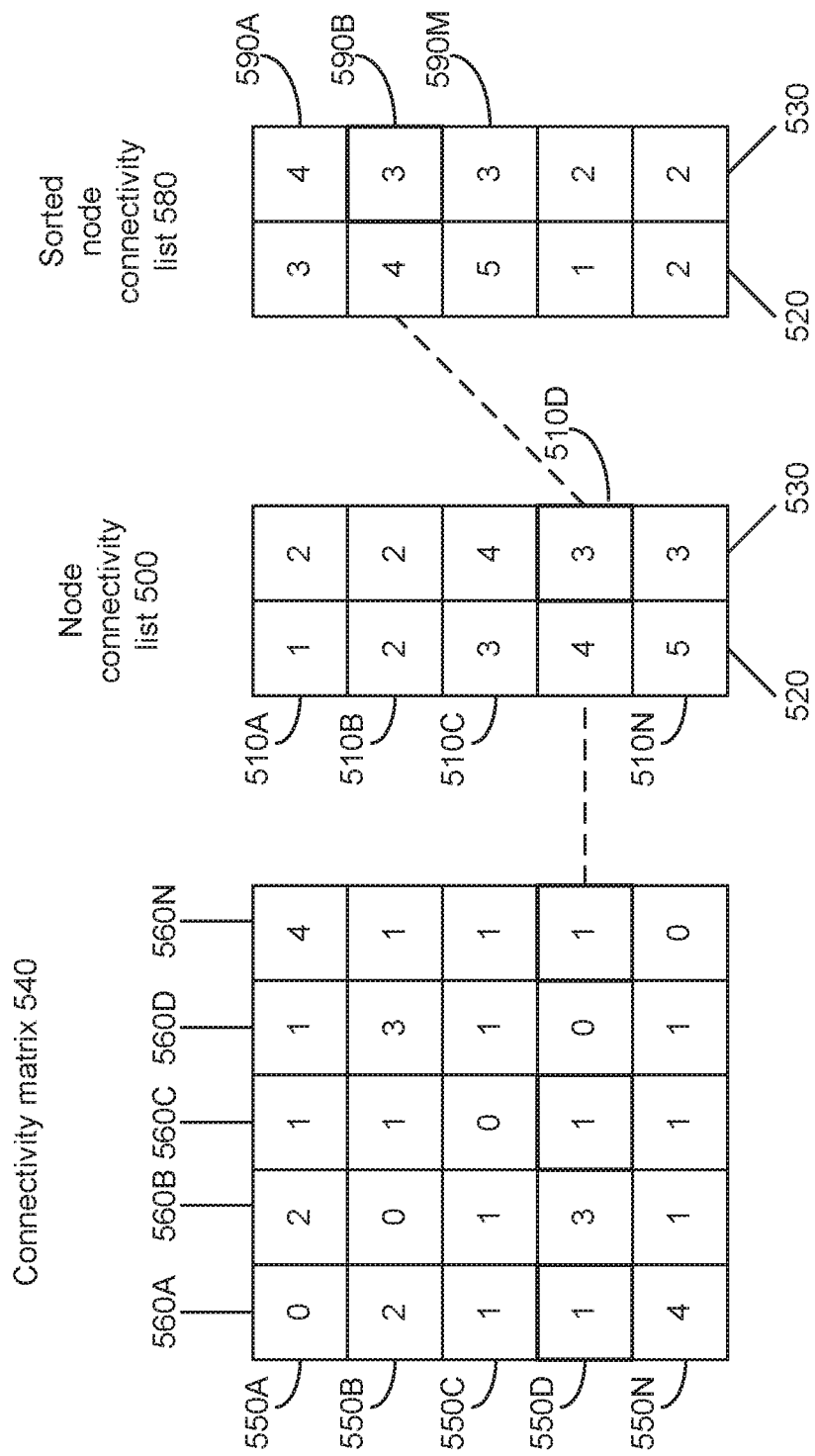
FIG. 5 schematically illustrates example data structures of the node connectivity list and connectivity matrix, in accordance with embodiments of the present disclosure.

FIG. 5 schematically illustrates an example data structure of the node connectivity list. The node connectivity list 500 includes entries 510A-510N. Each entry 510 includes the node identifier 520 and the node connectivity indicator 530.

In order to produce the node connectivity list, the mesh network control service may first generate a connectivity matrix 540. Each element $C_{ij}$ of the connectivity matrix C represents the number of network hops on the network path from node i identified by the row number to node j identified by the column number. In other words, each row 550A-550N of the connectivity matrix is a vector of elements 560A-560N, such that each element of the vector represents a number of network hops on the network path between the network node identified by the row number and the network node identified by the position of the element within the vector 560. For example, the row 550D of the connectivity matrix 540 lists the numbers of network hops on the network paths between the network node identified by the row number (i.e., node ID=4) and other nodes of the wireless mesh network. As shown in FIG. 5, the row 550D includes the following values: $C_{4,1}=1$ indicating that the number of network hop on the network path from node 4 to node 1 is 1; $C_{4,2}=3$ indicating that the number of network hop on the network path from node 4 to node 2 is 3; $C_{4,3}=1$ indicating that the number of network hop on the network path from node 4 to node 3 is 1; $C_{4,4}=0$ indicating that the number of network hop on the network path from node 4 to itself is 0; and $C_{4,5}=3$ indicating that the number of network hop on the network path from node 4 to node 5 is 3.

The connectivity matrix 540 may be generated, e.g., by querying each network node to provide the number of network hops on network paths between the queried node and other nodes of the wireless mesh networks. Using the connectivity matrix 540, the connectivity indicator of a given network node i may be determined by counting, in the i-th row or the i-th column, the number of matrix elements that are equal to one, and storing the count in the i-th element of the node connectivity list 500. For example, the row 550D of the connectivity matrix 540 includes three entries equal to one, namely, $C_{4,1}$, $C_{4,3}$ and $C_{4,5}$. Therefore, the connectivity indicator of the network node identified by the row number (i.e., node ID=4) is equal to three.

As noted herein above, the mesh network control service may store a given digital content item (having a replication factor RF=m) on m network nodes having the largest, among all network nodes, values of the node connectivity indicator. Accordingly, the mesh network control service may identify a subset of list entries that have largest, among all entries, values of the connectivity indicators, such that the number of entries comprised by the subset is equal to the replication factor RF=m.

In order to identify the subset of entries having the largest connectivity indicator values, the mesh network control service may order the node connectivity list 500 in the reverse order of the connectivity indicators 530A-530N thus producing the ordered node connectivity list 580. In the example of FIG. 5, the network node having the node identifier NodeID=3 occupies the top position 590A of the ordered list 580 since the node has the maximum number (four) of single-hop neighbors, the network node having the node identifier NodeID=4 occupies the second position 590B of the ordered list 580 since the node has the next largest number (three) of single-hop neighbors, the network node having the node identifier NodeID=4 occupies the third position 590M of the ordered list 580 since the node has the same number (three) of single-hop neighbors, etc.

The mesh network control service may store a given digital content item (having a replication factor RF=m) on the network nodes corresponding to the leading m entries 590A-590M of the ordered connectivity list 580, provided that such nodes have sufficient storage capacity. In the example of FIG. 5, assuming that RF=3, the mesh network control service would store copies of the digital content item on each of the top three nodes of the sorted node connectivity list 580, i.e., the nodes having the node identifier NodeID=3 (ordered list entry 590A), NodeID=4 (ordered list entry 590B), and NodeID=5 (ordered list entry 590M).

In one embodiment, if the network node identified for storing a digital content item does not have an amount of available storage that would be sufficient for storing the digital content item, the next node from the node connectivity list may iteratively be retrieved, unless a node having sufficient storage capacity is found or it is established that none of the nodes has sufficient storage capacity.

Level 2 replication may be performed for at least a subset of digital content items whose replication factor RF exceeds or is equal to two (RF>=2), to the extent that the network nodes have storage capacity which is sufficient to store copies of the digital content items, as described in more detail herein below with reference to FIG. 6.

In order to identify a node which stores a copy of a particular digital content item in a network implementing the above-described Level 2 replication strategy, the network node servicing the request from a client consumption device may identify one or more network nodes having the largest connectivity indicator values and may transmit one or more content requests to the identified nodes (e.g., starting with the node to which the requesting client has the shortest network path). Thus, the content lookup involves no broadcast requests and thus produces no significant overhead traffic in the wireless mesh network.

In order to compare the performance of content replication methods implementing various aspects of the present disclosure, including the methods described herein below with references to FIGS. 6-8, to other content replication methods, the inventors performed multiple simulation-based experiments. These experiments employed, e.g., a 32×32 grid topology for simulating the wireless mesh network, in which each node is connected to a maximum of eight neighbors, and the median connectivity for the node pairs is about 15 hops. The simulation compared a first content replication scheme implementing the methods of FIGS. 6-8 to a second scheme involving no content replication (i.e., all content is fetched from the CDN on every request) and to a third replication scheme, in which a content item is cached on the destination node requesting the content on behalf of the client and may eventually be evicted by a least-recently used eviction policy. Content look-up in the third replication scheme involves sending a broadcast request by the requesting client which would trigger responses from one or more nodes having the requested content items.

The distribution of client requests was simulated using a ZipF distribution with alpha parameter value of 0.7. For each client request, a requestor node was randomly selected from the node list. The requestor node implements the content look-up function to identify the network node storing a copy of the requested digital content item. Since, as noted herein above, look-up for content which is distributed on the network nodes by methods of the present disclosure does not involve broadcast, the methods of the present disclosure significantly reduce the traffic overhead in the wireless mesh network, as compared to other content replication schemes.

The simulation results are summarized in the following table:

| Content replication scheme | Median content fetch time | Maximum content fetch time |
| --- | --- | --- |
| Methods of the present disclosure | 4 | 8 |
| No replication | 13 | 31 |
| Content caching on requesting node | 8 | 27 |

As the table shows, the methods of the present disclosure provide a significant improvement over other methods of content replication, by reducing the median content fetch time by approximately 50% as compared to the best result demonstrated by other methods, and by reducing the maximum content fetch time by approximately 70% as compared to the best result demonstrated by other methods.

FIG. 6 is a flow diagram of one embodiment of a method of Level 1 content replication, in accordance with embodiments of the present disclosure. The method 600 may be performed by processing logic that includes hardware (e.g., circuitry, dedicated logic, programmable logic, microcode, etc.), software (e.g., instructions run on a processor to perform hardware simulation), or a combination thereof. In one embodiment, the method 600 may be performed by the mesh network control service 125 of FIG. 1.

Referring to FIG. 6, at block 610, the mesh network control service implementing the method may initialize the pointer to the list of content items to be replicated by the wireless mesh network nodes.

At block 620, the mesh network control service may determine a value of a hash function of the identifier of the content item referenced by the pointer. In one embodiment, the content item identifier may be provided by an arbitrary alphanumeric string, which may be truncated in order to fit the pre-defined size of the hash function input key. In one embodiment, the hash function may be represented by the jump consistent hash function which inputs a key (i.e., the digital content item identifier) and a number of network nodes, and returns the identifier of one of the network nodes, as described in more detail herein above.

Responsive to determining, at block 630, that the identified network node has an amount of available storage that is sufficient for storing the digital content item, the processing may continue at block 650; otherwise, the mesh network control service may, at block 640, iteratively identify a next candidate network node for storing the digital content item (e.g., by incrementing the node identifier by a pre-determined increment value), until a node having sufficient storage capacity is found or it is established, at block 645, that none of the nodes has sufficient storage capacity.

At block 650, the mesh network control service may store the digital content item on the identified network node.

At block 660, the mesh network control service may increment the pointer identifying the digital content item to be stored by the wireless mesh network.

Responsive to determining, at block 670, that the list of digital content items to be stored by network nodes has not yet been exhausted, the method may loop back to block 620; otherwise, the method may terminate at block 680.

Figure 7:
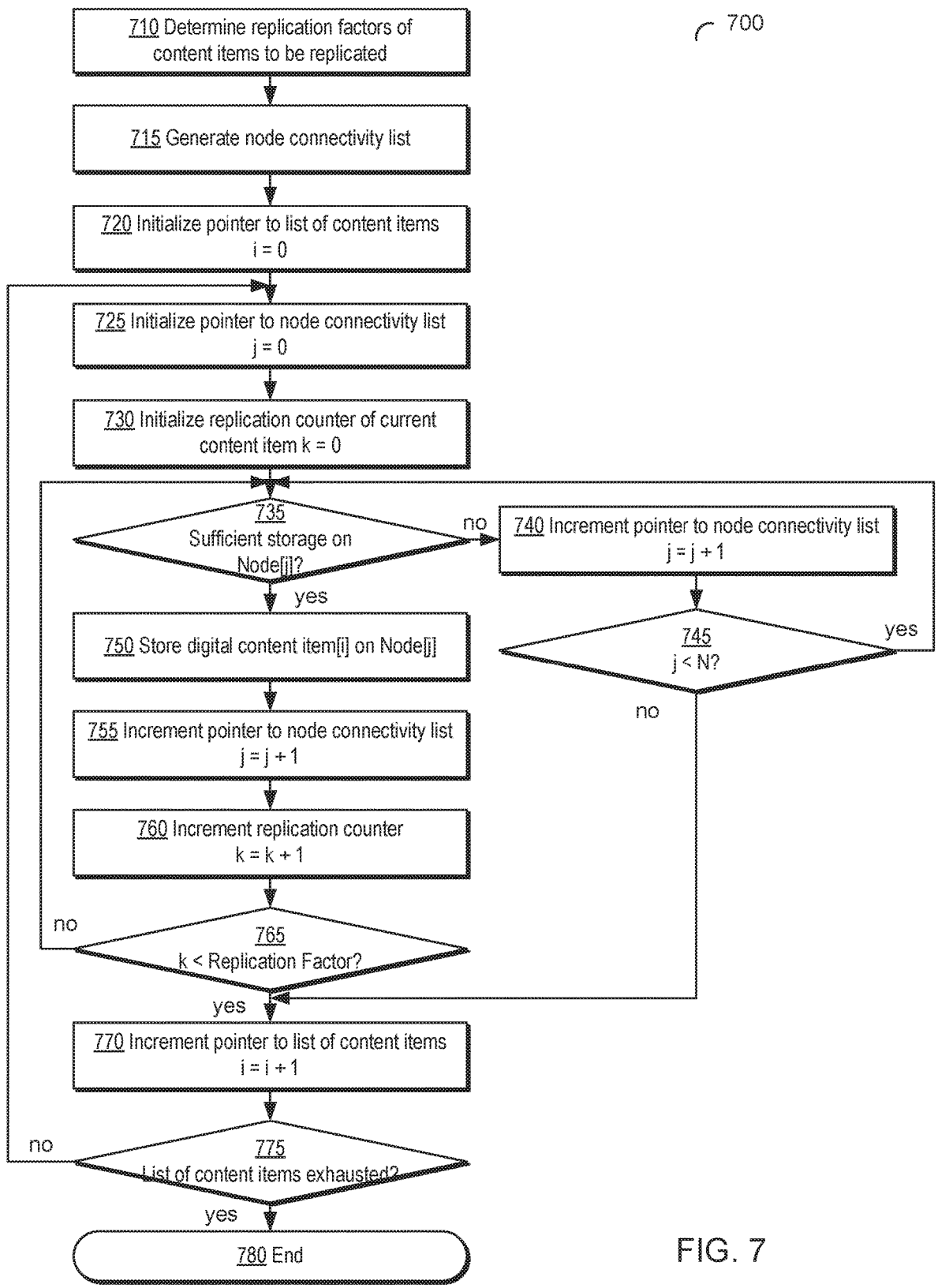
FIG. 7 is a flow diagram of one embodiment of a method of Level 2 content replication, in accordance with embodiments of the present disclosure.

FIG. 7 is a flow diagram of one embodiment of a method of Level 2 content replication, in accordance with embodiments of the present disclosure. The method 700 may be performed by processing logic that includes hardware (e.g., circuitry, dedicated logic, programmable logic, microcode, etc.), software (e.g., instructions run on a processor to perform hardware simulation), or a combination thereof. In one embodiment, the method 700 may be performed by the mesh network control service 127 of FIG. 1.

Referring to FIG. 7, at block 710, the mesh network control service implementing the method may determine replication factors of digital content items to be stored by the wireless mesh network nodes. In one embodiment, the replication factor may be represented by a function of the content item popularity, which, in turn, may be represented by the ratio of the number of actual or simulated requests for the digital content item and the number of actual or simulated requests for at least a subset of digital content items stored in the wireless mesh network, as described in more detail herein above.

At block 715, the mesh network control service may generate a node connectivity list for the network nodes, such that each entry of the list stores a mapping of a node identifier to the node connectivity indicator. The node connectivity list may be ordered in the reverse order of the connectivity indicators, as described in more detail herein above.

At block 720, the mesh network control service may initialize the pointer to the list of content items to be stored by the wireless mesh network nodes (i.e., content items whose replication factor exceeds or is equal to two (RF>=2)).

At block 725, the mesh network control service may initialize the pointer identifying a network node on the node connectivity list.

At block 730, the mesh network control service may initialize the replication counter for counting the number of copies of the current digital content item that are stored on one or more mesh network devices of the wireless mesh network.

Responsive to determining, at block 735, that the identified network node has an amount of available storage that is sufficient for storing the digital content item, the processing may continue at block 750; otherwise, the method may branch to block 740.

At block 740, the mesh network control service may increment the pointer identifying a network node on the node connectivity list.

Responsive to determining, at block 745, that the list of network nodes has not yet been exhausted, the method may loop back to block 735; otherwise, the processing may continue at block 770.

At block 750, the mesh network control service may store the digital content item on the identified network node.

At block 755, the mesh network control service may increment the pointer identifying a network node on the node connectivity list.

At block 760, the mesh network control service may increment the replication counter of the current digital content item.

Responsive to determining, at block 765, that the replication counter is less than the replication factor of the current digital content item, the method may loop back to block 735; otherwise, the processing may continue at block 770.

At block 770, the mesh network control service may increment the pointer identifying the digital content item to be stored by the wireless mesh network.

Responsive to determining, at block 775, that the list of digital content items to be stored by network nodes has not yet been exhausted, the method may loop back to block 725; otherwise, the method may terminate at block 780.

Figure 8:
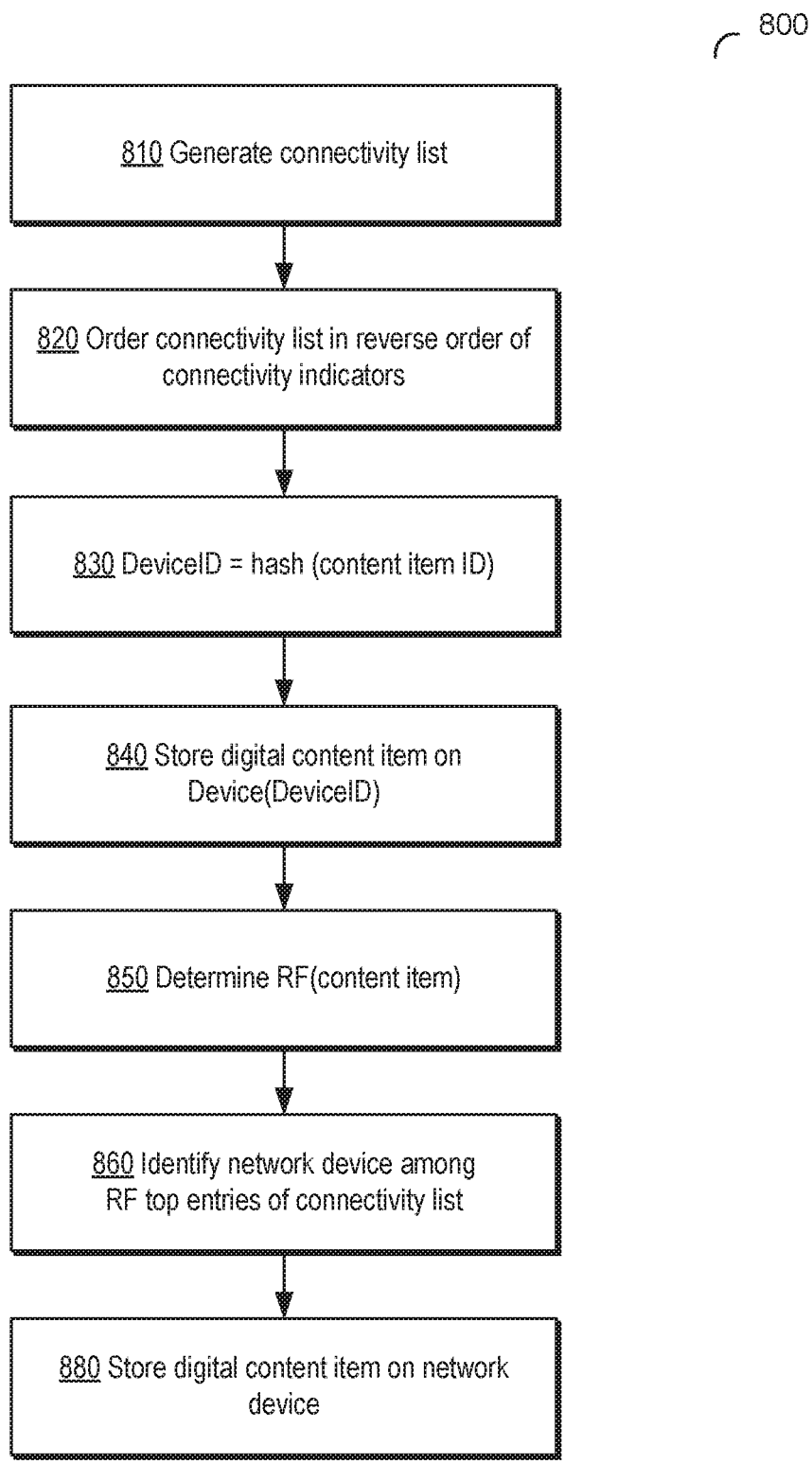
FIG. 8 is a flow diagram of one embodiment of a method of content replication, in accordance with embodiments of the present disclosure.

FIG. 8 is a flow diagram of one embodiment of a method of content replication, in accordance with embodiments of the present disclosure. The method 800 may be performed by processing logic that includes hardware (e.g., circuitry, dedicated logic, programmable logic, microcode, etc.), software (e.g., instructions run on a processor to perform hardware simulation), or a combination thereof. In one embodiment, the method 800 may be performed by the mesh network control service 128 of FIG. 1.

Referring to FIG. 8, at block 810, the mesh network control service implementing the method may generate a connectivity list for the mesh network devices, such that each entry of the list specifies a mesh network device and the connectivity indicator of the mesh network device. The connectivity indicator may be represented by a number of one-hop neighboring mesh network devices of the mesh network device, as described in more detail herein above.

At block 820, the mesh network control service may order the connectivity list in the reverse order of the connectivity indicators.

At block 830, the mesh network control service may determine a value of a hash function of an identifier of a digital content item to be stored by the wireless mesh network. In one embodiment, the content item identifier may be provided by an arbitrary alphanumeric string, which may be truncated in order to fit the pre-defined size of the hash function input key. In one embodiment, the hash function may be represented by the jump consistent hash function which inputs a key (i.e., the digital content item identifier) and a number of network nodes, and returns the identifier of one of the network nodes, as described in more detail herein above.

At block 840, the mesh network control service may store the digital content item to the mesh network device identified by the value of the hash function.

In one embodiment, if the network device identified by the device identifier produced by hashing the digital content identifier does not have an amount of available storage that would be sufficient for storing the digital content item, the device identifier may iteratively be incremented by a pre-determined increment value (e.g., 1) until a network device having sufficient storage capacity is found or it is established that none of the network devices has sufficient storage capacity.

At block 850, the mesh network control service may determine the replication factor of the digital content item. In one embodiment, the replication factor may be represented by a function of the content item popularity, which, in turn, may be represented by the ratio of the number of actual or simulated requests for the digital content item and the number of actual or simulated requests for at least a subset of digital content items stored in the wireless mesh network, as described in more detail herein above.

At block 860, the mesh network control service may identify network devices represented by a subset of entries that includes m leading entries of the ordered connectivity list, where m is the replication factor of the digital content item. In an illustrative example, the mesh network control service may identify a network device represented by an entry selected among m leading entries of the connectivity list.

In one embodiment, if the network device identified for storing the digital content item does not have an amount of available storage that would be sufficient for storing the digital content item, the next network device from the connectivity list may iteratively be retrieved, unless a network device having sufficient storage capacity is found or it is established that none of the network devices have sufficient storage capacity.

At block 870, the mesh network control service may store the digital content item to the identified mesh network devices, and the method may terminate.

In one embodiment, a wireless mesh network may implement a content caching strategy, according to which the same digital content (e.g., video content) may be made available to client network devices in multiple resolutions and bit rates. Examples of encodings identified by a combination of the resolution and the bit-rate include: 540×960 @ 1.9 Mbps, 720×1280@2.2 Mbps, 720×1280@3.5 Mbps, 1080×1920@ 5.0 Mbps, 1080×1920@9.0 Mbps, etc. A higher resolution encoding has more pixels and hence may produce s sharper feature and color scale definition than a lower resolution. A higher bit-rate transmits more pixels per second and hence may provide a larger number of video frame per seconds than a lower bit-rate.

In wireless mesh networks, the throughput, latency, and/or other characteristics of a network path between the client device and the content serving node may fluctuate significantly, e.g., due to the network congestion caused by varying number of client network devices utilizing the same network links. In order to improve the user's experience in consuming the digital content, the changing network conditions may be compensated by implementing a content caching scheme that involves storing, for a given digital content item, one or more primary copies and one or more secondary copies, and selectively delivering one of the copies to the client network device. The primary copy may be encoded using the higher resolution and/or higher bit rate than the secondary copy.

Accordingly, in one embodiment, the network node to which the client device is connected may, responsive to receiving a content request from the client device, select one of the primary and backup copies for streaming to the client device. The network node may later switch to another copy based on the current and/or predicted network parameters, such as the throughput, latency, and/or other characteristics of the network path between the client device and the content serving node. In another embodiment, the mesh network management service 127 may monitor the network path parameters and may instruct the requesting client to switch from one copy to another responsive to detecting a change in the network parameters.

Thus, the content caching strategy may define the encodings (i.e., the resolution and/or bit rates) for the primary and backup copies and may further define the conditions under which the network device should switch between the primary and backup copies. The content caching strategy may be designed to maximize the Mean-Opinion-Score (MOS) (i.e., the arithmetic mean of all individual values of the user experience of consuming the digital content) and/or minimize the service-unavailability rate (e.g., measured as the number of denied requests for content due to the unavailability of content in a target encoding that is playable under the current network conditions).

In one embodiment, the mesh network management service 127 may identify the parameters (i.e., the resolution and/or bit rates) for the primary and backup copies and identify the network nodes for storing the primary and backup copies. The parameters of the primary and backup copies may be identified based on the business requirements and/or technical feasibility. In an illustrative example, the business requirements may call for providing high definition (HD) video content items, which would require the client network device to have, e.g., a consistent 3.5 Mbps throughput on the network path to the content serving node. Due to the above-noted parameter fluctuation in wireless mesh networks, the encoding for backup copy may be selected with a lower resolution rate, which would require, e.g., 1.3 Mbps throughput on the network path to the content serving node. While delivering the backup copy may adversely affect the user experience, this would still be better than the content unavailability which could otherwise arise.

While the business requirements may mostly affect the choice of parameters of the primary copy, parameters of one or more secondary copies may be determined based on the actual or simulated network parameters and traffic patterns, such as average, over a period of time, values of network throughput on different network links, amounts of storage available on the network nodes, etc.

In one embodiment, a client device running a digital content player component may connect to a content server residing on a network node and request a manifest for a specified digital content. The manifest may include a list of available encodings of the specified digital content. The client device may then construct a new manifest specifying one or more selected encodings and transmit, to the network node, a content request including the new manifest. The network node may then identify the requested digital content and initiate the streaming process.

Figure 9:
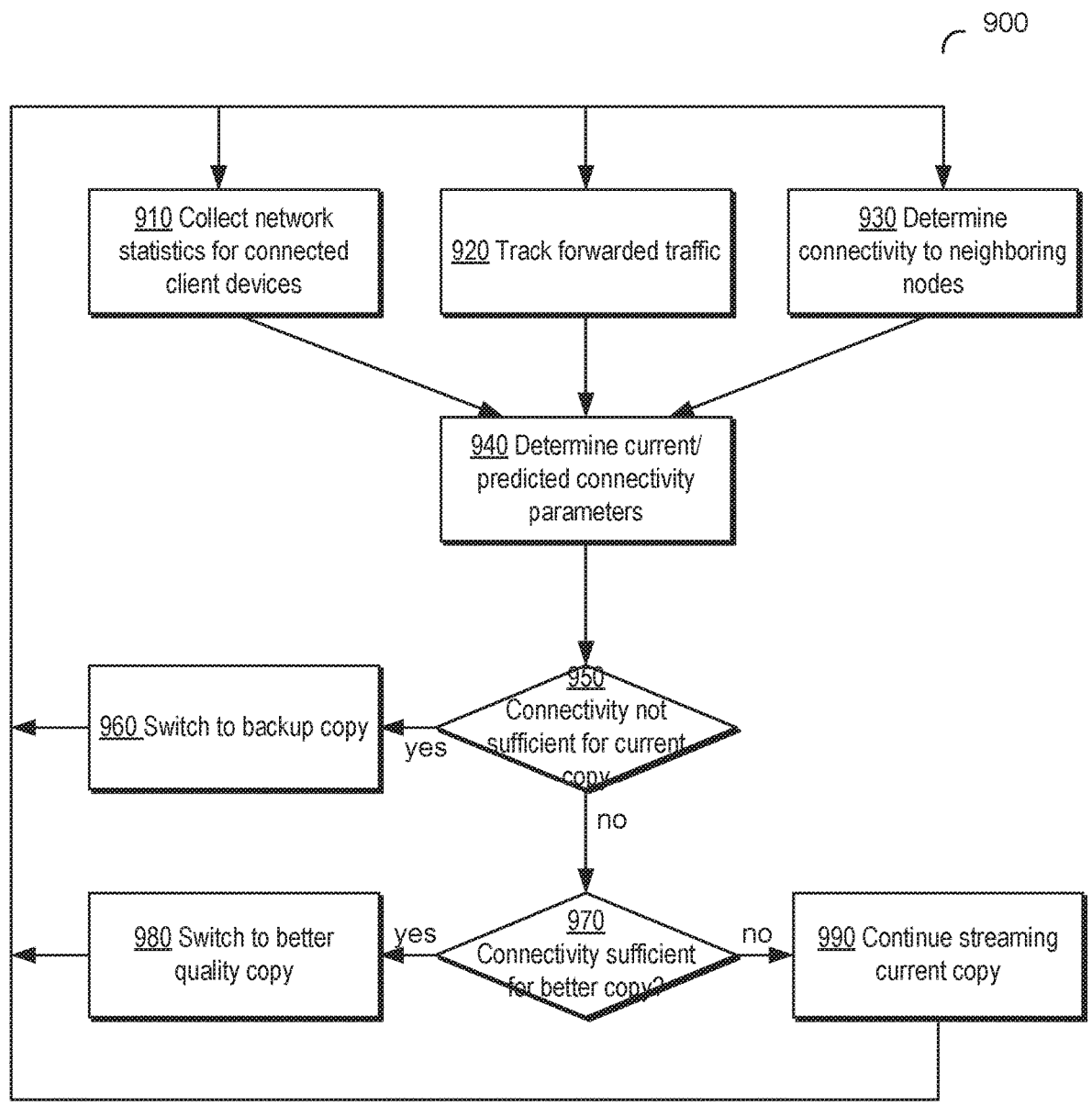
FIG. 9 is a flow diagram of one embodiment of a method of content caching, in accordance with embodiments of the present disclosure.

FIG. 9 is a flow diagram of one embodiment of a method of content caching, in accordance with embodiments of the present disclosure. The method 900 may be performed by processing logic that includes hardware (e.g., circuitry, dedicated logic, programmable logic, microcode, etc.), software (e.g., instructions run on a processor to perform hardware simulation), or a combination thereof. In one embodiment, the method 900 may be performed by any one of the network devices 109-140 of FIG. 1. In one embodiment, the method 900 may be performed by any one of the network devices 210-230 of FIG. 2. In one embodiment, the method 900 may be performed by the network device 1100 of FIG. 11. In one embodiment, the method 900 may be performed by the application processor 1250 of FIG. 12. In one embodiment, the method 900 may at least partially be performed by the mesh network control service 126 of FIG. 1.

Referring to FIG. 9, at block 910, the network device implementing the method may receive values of network parameters for one or more client network devices connected to this network device. The network parameters may include the initial buffering time (i.e., the time period between a user interface command requesting the playback and the actual start of the playback), total buffering time (i.e., the total time of buffering during the playback), the number of media player errors during the playback (e.g., content unavailable, buffer overrun/underrun, etc.), the number of frame with zero errors, the number of frames played with zero buffering, the number of content items played with at least some stalling, the ratio of the stalling time to the total playback time, the lag ratio (i.e., the ratio of the waiting time and the playback time), and encoding types (encoding rates and resolutions). In one embodiment, at least some of the network parameter values may be collected and communicated to the network device by the network management service 127.

At block 920, the network device may track the forwarded network traffic, i.e., the traffic which is not originated by or addressed by the client network devices connected to this network device. The network device may periodically measure the ratio of the forwarded traffic to the total amount of traffic received and/or transmitted by the network device.

At block 930, the network device may evaluate the connectivity to one or more neighboring network devices, using the Received Signal Strength Indicator (RSSI) or signal-to-interference-plus-noise ratio (SINR) values.

At block 940, the network device may utilize the data collected at blocks 920-930 in order to determine the current connectivity parameters and/or predict connectivity parameters (e.g., the latency and/or throughput) for one or more client network devices in communication with the network device.

Responsive to determining, at block 950, that the current and/or predicted network parameters are not sufficient for delivering the currently selected copy, the network device may, at block 960, switch to a backup copy which can be delivered to the client device under the current and/or predicted network parameters, and the method may loop back to block 910; otherwise, the processing may continue at block 970.

The analyzed network parameters may include the initial buffering time (i.e., the time period between a user interface command requesting a playback and the actual start of the playback), total buffering time (i.e., the total time of buffering during the playback), the number of media player errors during the playback (e.g., content unavailable, buffer overrun/underrun, etc.), the number of frame with zero errors, the number of frames played with zero buffering, the number of content items played with at least some stalling, the ratio of the stalling time to the total playback time, the lag ratio (i.e., the ratio of the waiting time and the playback time), and/or encoding types (encoding rates and resolutions). In one embodiment, switching to the backup copy may be performed responsive to determining that at least one of the above-listed parameters falls below (or exceeds) a corresponding threshold parameter value. In one embodiment, switching to the backup copy may be performed responsive to determining that the total amount of traffic through the network device (including the forwarded traffic and the traffic originated by and/or destined to the client network devices which are currently connected to the network device) exceeds a threshold traffic value. In one embodiment, switching to the backup copy may be performed responsive to determining that the connectivity with a client network device (e.g., measured by the RSSI) falls below a threshold connectivity value.

Responsive to determining, at block 970, that the current and/or predicted network parameters are sufficient for delivering a copy with a better encoding than that of the currently selected copy, the network device may, at block 980, switch to the better quality copy, and the method may loop back to block 910; otherwise, the processing may continue at block 990.

In one embodiment, switching to the better quality copy may be performed responsive to determining that all switching conditions are satisfied. The switching conditions may include determining that one of the above-listed network parameters falls below (or exceeds) a corresponding threshold parameter value. The switching conditions may further include determining that the total amount of traffic through the network device (including the forwarded traffic and the traffic originated by and/or destined to the client network devices which are presently connected to the network device) falls below a threshold traffic value. The switching conditions may further include determining that the connectivity with a client network device (e.g., measured by the RSSI) exceeds a threshold connectivity value.

At block 990, the network device may continue streaming the currently selected copy, and the method may loop back to block 910.

Figure 10:
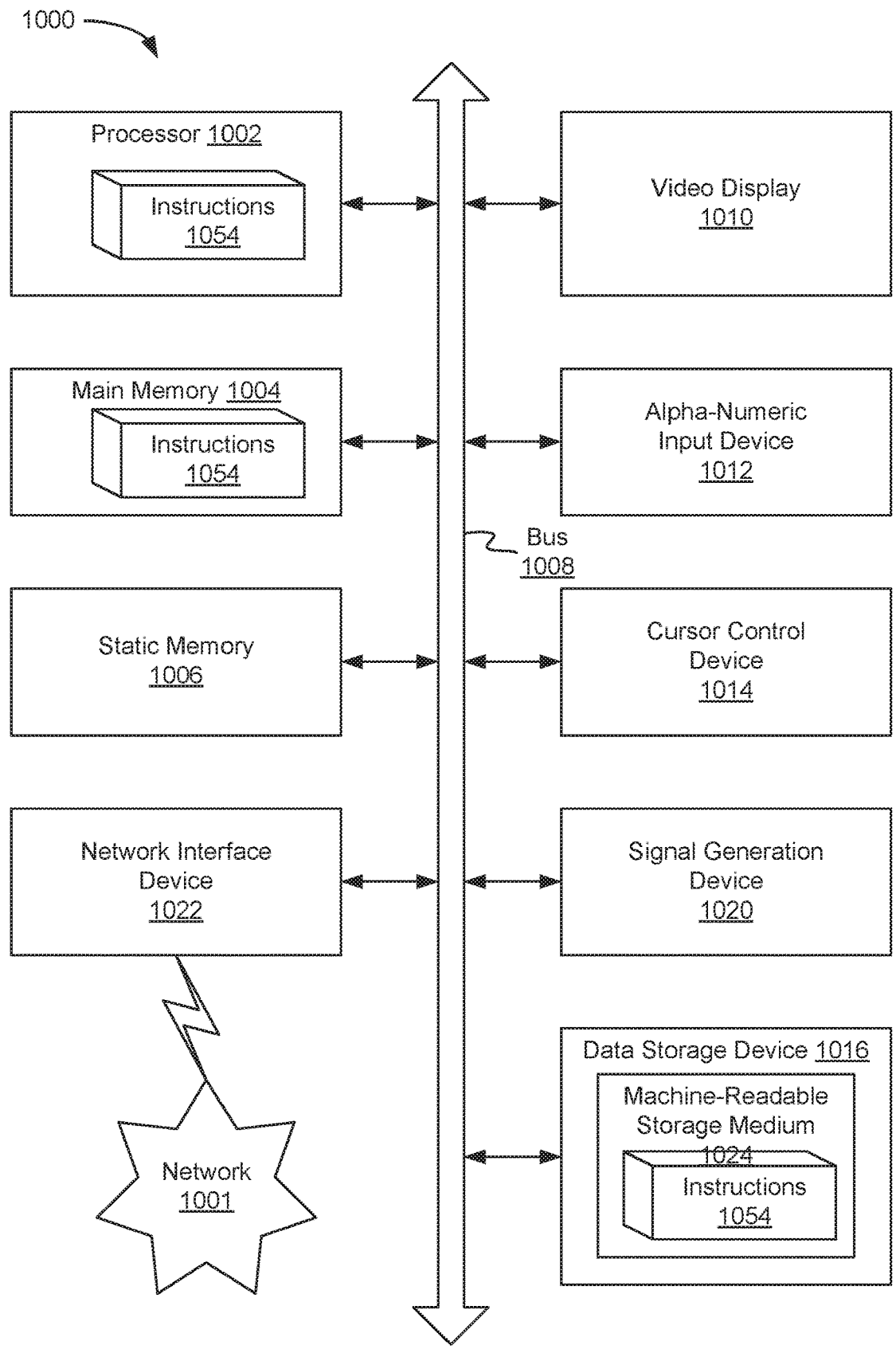
FIG. 10 illustrates a component diagram of a computer system which may implement one or more methods of content replication and/or caching described herein.

FIG. 10 illustrates a component diagram of a computer system which may implement one or more methods of content replication and/or caching described herein. A set of instructions for causing the computer system 1000 to perform any one or more of the methods discussed herein may be executed by the computer system 1000. In one embodiment, the computer system 1000 may implement the functions of the mesh network management service 127 of FIG. 1.

In one embodiment, the computer system 1000 may be connected to other computer systems by a network 1001 provided by a Local Area Network (LAN), an intranet, an extranet, the Internet or any combination thereof. The computer system may operate in the capacity of a server or a client machine in a client-server network environment or as a peer machine in a peer-to-peer (or distributed) network environment. The computer system may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computer system" shall also be taken to include any collection of machines (e.g., computers) that individually or jointly execute a set (or multiple sets) of instructions to perform any one or more of the methodologies discussed herein.

In one embodiment, the computer system 1000 includes a processing device 1002, a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.) and a data storage device 1016, which communicate with each other via a bus 1008.

In one embodiment, the processing device 1002 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 1002 may therefore include multiple processors. The processing device 1002 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor or the like.

In one embodiment, the computer system 1000 may further include one or more network interface devices 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and a signal generation device 1020 (e.g., a speaker).

In one embodiment, the data storage device 1018 may include a computer-readable storage medium 1024 on which is stored one or more sets of instructions 1054 embodying any one or more of the methods or functions described herein. The instructions 1054 may also reside, completely or at least partially, within the main memory 1004 and/or within the processing device 1002 during execution thereof by the computer system 1000; the main memory 1004 and the processing device 1002 also constituting machine-readable storage media.

While the computer-readable storage medium 1024 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods described herein. Examples of computer-readable storage media include, but not limited to, solid-state memories, optical media and magnetic media.

Figure 11:
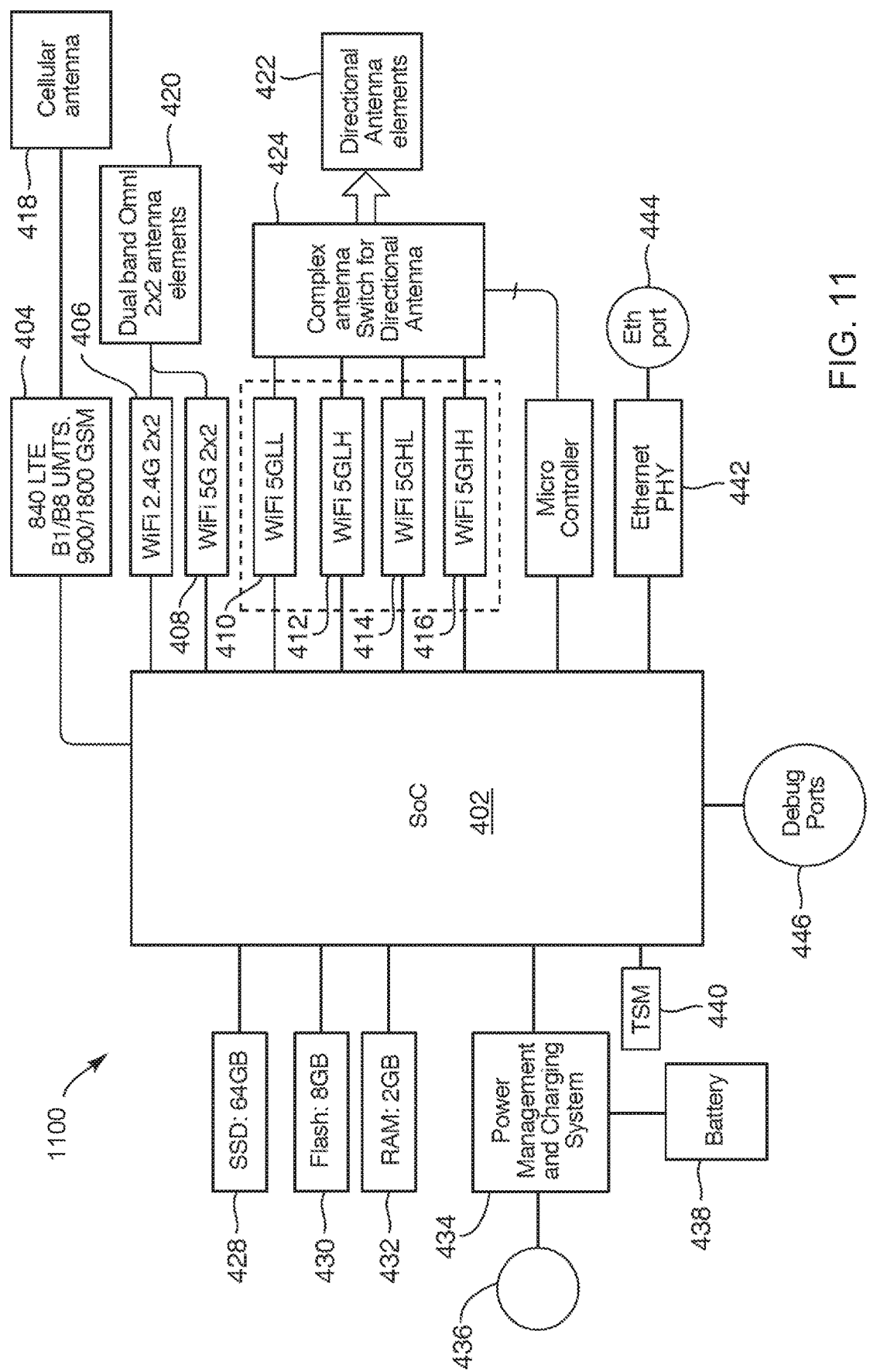
FIG. 11 is a block diagram of an example network device operating in accordance with embodiments of the present disclosure.

FIG. 11 is a block diagram of an example network device 1100 operating in accordance with embodiments of the present disclosure. The network device 1100 may be one of many network devices organized in a wireless mesh network (e.g., wireless mesh network 110). The network device 1100 is one of the nodes in a wireless mesh network in which the network device 1100 cooperates with other network devices in distribution of content files to client consumption devices in an environment of limited connectivity to broadband Internet infrastructure, as described herein. The network device 1100 may be the mini-POP node 112 of FIG. 1. Alternatively, the network device 1100 may be any one of the network devices 114, 116, 118, and 111 of FIG. 1. In another embodiment, the network device 1100 is any one of the network nodes 211-230 of FIG. 2.

The network device 1100 includes a system on chip (SoC) 402 to process data signals in connection with communicating with other network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A15 1.5 GHz with hardware network acceleration. The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF module 404 (e.g., HSCI interface for cellular module (3G)), a second interface to the WLAN 2.4 GHz radio 406, a third interface to the WLAN 2.4 GHz radio 408, and multiple interfaces to the WLAN 5 GHz radios, such as on a PCIe bus. In one embodiment, the SoC 402 is the IPQ8064 Qualcomm SoC or the IPQ40211 Qualcomm SoC. Alternatively, other types of SoCs may be used, such as the Annapurna SoC, or the like. Alternatively, the network device 1100 may include an application processor that is not necessarily considered to be a SoC.

The network device 1100 may also include memory and storage. For example, the network device 1100 may include SSD 64 GB 428, 8 GB Flash 430, and 2 GB 432. The memory and storage may be coupled to the SoC 402 via one or more interfaces, such as USB 3.0, SATA, or SD interfaces. The network device 1100 may also include a single Ethernet port 444 that is an ingress port for IP connection. The Ethernet port 444 is connected to the Ethernet PHY 442, which is connected to the SoC 402. The Ethernet port 444 can be used to service the network device 1100. Although the Ethernet port 444 could provide wired connections to client devices, the primary purpose of the Ethernet port 444 is not to connect to client devices, since the 2.4 GHz connections are used to connect to clients in the WMN. The network device 1100 may also include one or more debug ports 446, which are coupled to the SoC 402. The memory and storage may be used to store content, as well as store software, firmware or other data for the network device 1100.

The network device 1100 may also include a power management and charging system 434. The power management and charging system 434 can be connected to a power supply 436 (e.g., 240V outlet, 120V outlet, or the like). The power management and charging system 434 can also connect to a battery 438. The battery 438 can provide power in the event of power loss. The power management and charging system 434 can be configured to send a SoS message on power outage and backup system state. For example, the WLAN radios can be powered down, but the cellular radio can be powered by the battery 438 to send the SoS message. The battery 438 can provide limited operations by the network device 1100, such as for 11 minutes before the entire system is completely powered down. In some cases, power outage will likely affect a geographic area in which the network device 1100 is deployed (e.g., power outage that is a neighborhood wide phenomenon). The best option may be to power down the network device 1100 and let the cloud service (e.g., back end service) know of the outage in the WMN. The power management and charging system 434 may provide a 15V power supply up to 21 watts to the SoC 402. Alternatively, the network device 1100 may include more or less components to operate the multiple antennas as described herein.

The network device 1100 includes a first radio frequency (RF) module 404 coupled between the SoC 402 and a cellular antenna 418. The first RF module 404 supports cellular connectivity using the cellular antenna 418. In one embodiment, the cellular antenna 418 includes a primary wide area network (WAN) antenna element and a secondary WAN antenna element. The first RF module 404 may include a modem to cause the primary WAN antenna, the secondary WAN antenna, or both to radiate electromagnetic energy in the 1100 MHz band and 11100 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 1100/11100. The modem may or may not support CDMA. The cellular modem may be used for diagnostics, network management, metadata download, or the like. Alternatively, the first RF module 404 may support other bands, as well as other cellular technologies. The network device 1100 may include a GPS antenna and corresponding GPS module to track the location of the network device 1100, such as moves between homes. However, the network device 1100 is intended to be located inside a structure, the GPS antenna and module may not be used in some embodiments.

The network device 1100 includes a first set of wireless local area network (WLAN) modules 406, 408 coupled between the SoC 402 and dual-band omnidirectional antennas 420. A first WLAN module 406 may support WLAN connectivity in a first frequency range using one of the dual-band omnidirectional antennas 420. A second WLAN module 408 may support WLAN connectivity in a second frequency range using one of the dual-band omnidirectional antennas 420. The dual-band omnidirectional antennas 420 may be two omnidirectional antennas for 2.4 GHz. The directional antennas 422 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 420 and the directional antennas 422 can be implemented as a fully switchable antenna architecture controlled by micro controller 426. For example, each 5 GHz radio can choose any 2 sectors (for 2 2x2 MU-MIMO streams).

The network device 1100 includes a second set of WLAN modules 410-416 coupled between the SoC 402 and antenna switching circuitry 424. The second set of WLAN modules 410-416 support WLAN connectivity in the second frequency range using a set of directional antennas 422. The second set of WLAN modules 410-416 is operable to communicate with the other network devices of the WMN. The antenna switching circuitry 424 is coupled to a micro controller 426. The micro controller 426 controls the antenna switching circuitry 424 to select different combinations of antennas for wireless communications between the network device 1100 and the other network devices, the client consumption devices, or both. For example, the micro controller 426 can select different combinations of the set of directional antennas 422. In another embodiment, a filter switch bank is coupled between the antenna switching circuitry 424 and the second set of WLAN modules 410-416. In another embodiment, the filter switch bank can be implemented within the antenna switching circuitry 424.

In the depicted embodiment, the first set of WLAN modules include a first a first 2x2 2.4 GHz MIMO radio 406 and a 2x2 5 GHz MIMO radio 408. The second set of WLAN modules includes a first 2x2 5 GHz MIMO radio 410 ("5GLL"), a second 2x2 5 GHz MIMO radio 412 ("5GLH"), a third 2x2 5 GHz MIMO radio 414 ("5GHL"), and a fourth 2x2 5 GHz MIMO radio 416 ("5GHH"). The dual-band omnidirectional antennas 420 may include a first omnidirectional antenna and a second omnidirectional antenna (not individually illustrated in FIG. 11). The set of directional antennas 422 includes: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the network device 1100 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the network device 1100 may be based on CSMA-CA, not TDMA. Deciding where the data will be coming into the network device 1100 is not known prior to receipt, so dynamic switching may not add much benefit. It should also be noted that network backbone issues, such as one of the network devices becoming unavailable, may trigger another neighbor sounding process to determine a new switch configuration. Once the neighbor sounding process is completed, the network device 1100 can adapt a beam patter to be essentially fixed since the network devices are not intended to move once situated.

In one embodiment, the antenna switching circuitry 424 includes multiple diplexers and switches to connect different combinations of antennas to the multiple radios. One configuration for the antenna switching circuitry 424 is a switch matrix architecture. In this architecture, there are six 2x2 WLAN radios (also referred to as the Wi-Fi® radios). Five radios are 5 GHz band and one radio is a 2.4 GHz radio. A switch matrix is implemented to allow the connection of each and any of the four 2x2 radios to any of the Vx/Hx MIMO antennas. Based on the switch matrix configuration and based on the routing algorithms input, each 2x2 radio can connect to a specific antenna pair in a specific direction. Each 2x2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the network device 1100.

Figure 12:
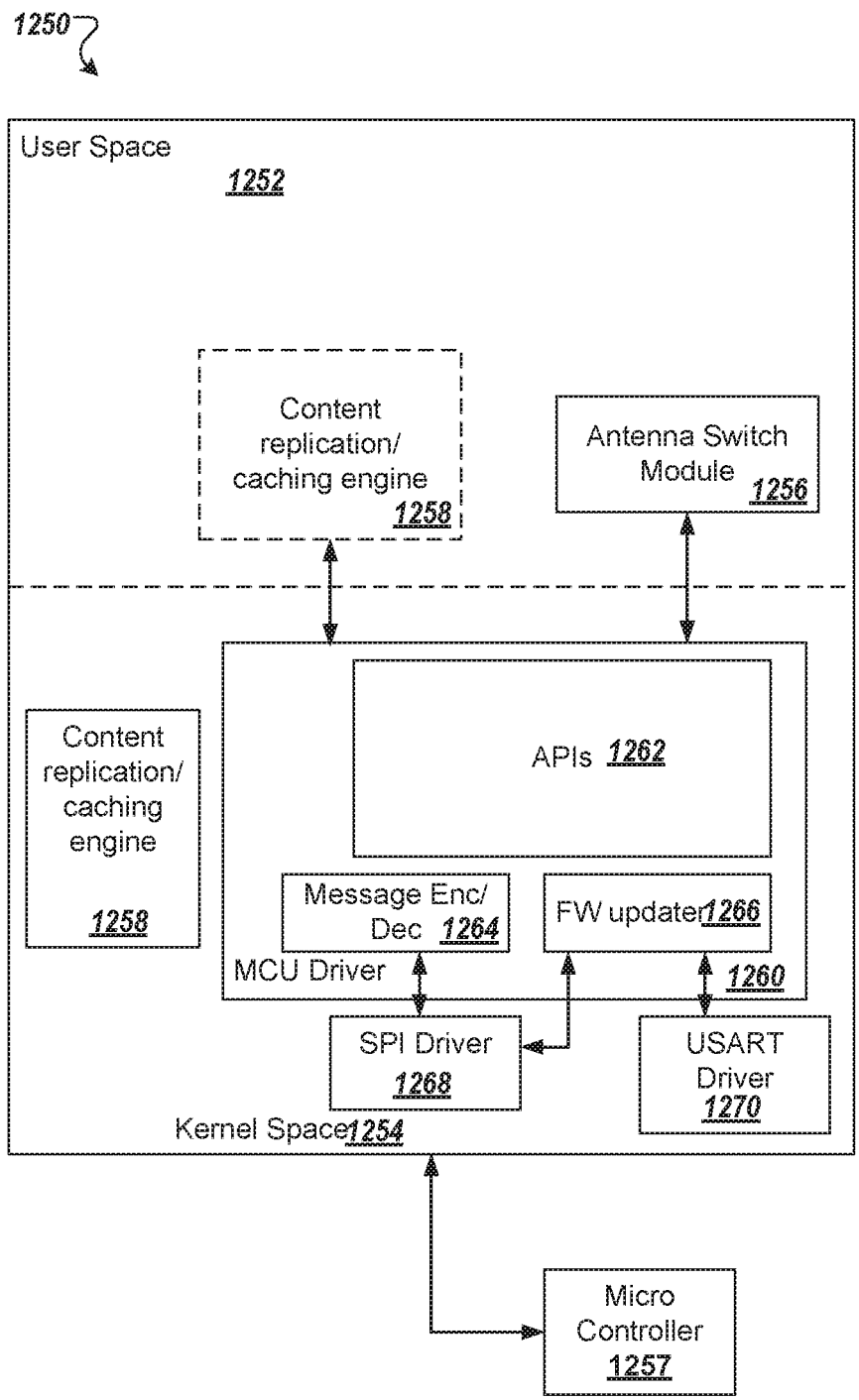
FIG. 12 is a block diagram of an application processor in which the content replication/caching engine operating in accordance with embodiments of the present disclosure may be implemented.

FIG. 12 is a block diagram of an application processor in which the content replication/caching engine operating in accordance with embodiments of the present disclosure may be implemented. The application processor 1250 executes an operating system that segregates memory (virtual memory) into user space 1252 and kernel space 1254. In this embodiment, the content replication/caching engine 1258 runs in the user space 1252. In other embodiments, some or the entire content replication/caching engine 1258 can be implemented in the kernel space 1254. The content replication/caching engine 1258 may be instructions that when executed by the application processor 1250 perform various network path selection operations as described below with respect to FIGS. 12-12. The content replication/caching engine 1258 can perform the content caching methods described herein. The application processor 1250 can communicate with neighbor network devices to route data traffic on a network backbone of multiple P2P wireless connections between the network devices.

In the kernel space 1254, a micro controller unit (MCU) driver 1260 can execute. The MCU driver 1260 may include multiple application programming interfaces (APIs) 1262 to interface to other components, such as the radios and micro controller, as described herein. The APIs 1262 can communicate messages to other components and may use a message encoder/decoder 1264 to encode and decode these messages. The APIs 1262 may include an API for getting firmware versions, an API for updating the firmware, and an API for getting radio information (e.g., radio configuration, antenna configuration, channel information, chamber/sector information, or the like). The MCU driver 1260 may also include a firmware (FW) updater 1266. Also, the kernel space 1254 may include a serial packet interface (SPI) driver 1268 and a Universal Synchronous/Asynchronous Receiver/Transmitter (USART) driver 1270.

In one embodiment, there is an interface mechanism between the user space 1252 and kernel space 1254 that has minimum latency. For example, in cases when there is an invalid configuration being input by an application, such as the content replication/caching engine 1258, the error should be reported as quickly as possible to the application. The application processor 1250 may also include power management modules in the user space 1252 or in the kernel space 1254 since the application processor 1250 could be operating in a battery-backed operating state during power outages.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A computer system, comprising:
   a memory to store instructions of a content replication engine; and
   a processor coupled to the memory, wherein the processor to:
   generate an initial list comprising a first entry and a second entry, wherein the first entry includes a first identifier of a first mesh network device of a wireless mesh network and a first number of neighboring mesh network devices that are reachable by the first mesh network device over a first single-hop network path, and wherein the second entry includes a second identifier of a second mesh network device of the wireless mesh network and a second number of neighboring mesh network devices that are reachable by the second mesh network device over a second single-hop network path;
   order the initial list in a descending order of the numbers of neighboring mesh network devices to produce an ordered list;
   determine a replication factor for the digital content item by calculating a ratio of a number of client requests for the digital content item and a number of client requests for a plurality of digital content items stored on mesh network devices of the wireless mesh network, wherein the replication factor reflects a number of copies of the digital content item to be stored on one or more mesh network devices;

identify a subset of entries of the ordered list, wherein a number of entries comprised by the subset is equal to the replication factor, wherein the subset includes the first entry and the second entry; and cause a first copy of the digital content item to be stored on the first mesh network device referenced by the first entry.

2. The computer system of claim 1, wherein to generate the initial list, the processor is to:

generate a connectivity matrix comprising a plurality of rows, wherein a first row of the plurality of rows is represented by a vector comprising a plurality of elements, wherein a particular element of the plurality of elements comprises a number of network hops on a network path between the first mesh network device and a third mesh network device identified by a position of the particular element in the first row;

determine the first number of the neighboring mesh network devices by counting, in the first row, elements having a value of one.

3. The computer system of claim 1, wherein the processor is further to:

determine that a number of copies of the digital content item that are stored by one or more devices of the wireless mesh network is less than the replication factor;

cause a second copy of the digital content item to be stored on the second mesh network device referenced by the second entry.

4. A method, comprising:

generating a list comprising a first entry and a second entry, wherein the first entry includes a first identifier of a first mesh network device of a wireless mesh network and a first connectivity indicator of the first mesh network device, and wherein the second entry includes a second identifier of a second mesh network device of the wireless mesh network and a second connectivity indicator of the second mesh network device;

determining a replication factor for a digital content item;

identifying a subset of entries that have largest, among all entries, values of the connectivity indicators, wherein a number of entries comprised by the subset is equal to the replication factor, wherein the subset includes the first entry and the second entry; and causing a first copy of the digital content item to be stored on the first mesh network device referenced by the first entry.

5. The method of claim 4, wherein the first connectivity indicator comprises a number of neighboring mesh network devices that are reachable by the first mesh network device over a single-hop network path.

6. The method of claim 4, wherein the replication factor reflects a number of copies of the digital content item to be stored on one or more mesh network devices of the wireless mesh network.

7. The method of claim 4, wherein determining the replication factor further comprises:

calculating a ratio of a number of client requests for the digital content item and a number of client requests for a plurality of digital content items stored on mesh network devices of the wireless mesh network.

8. The method of claim 4, wherein generating the list further comprises:

generate a connectivity matrix comprising a plurality of rows, wherein a first row of the plurality of rows is represented by a vector comprising a plurality of elements, wherein a particular element of the plurality of elements comprises a number of network hops on a network path between the first mesh network device and a third mesh network device identified by a position of the particular element in the first row;

determining the first number of the neighboring mesh network devices by counting, in the first row, elements having a value of one.

9. The method of claim 4, wherein generating the list further comprises:

querying the first mesh network device to provide a number of mesh network hops on a network path between the first mesh network device and the second mesh network device.

10. The method of claim 4, further comprising:

applying a hash function to an identifier of the digital content item to determine a third identifier of a third mesh network device;

cause a second copy of the digital content item to be stored on the third mesh network device.

11. The method of claim 4, further comprising:

determining that a number of copies of the digital content item that are stored by one or more devices of the wireless mesh network is less than the replication factor;

causing a second copy of the digital content item to be stored on the second mesh network device referenced by the second entry.

12. The method of claim 4, wherein identifying a subset of entries further comprises:

ordering the list in a descending order of the connectivity indicators.

13. A computer system, comprising:

a memory; and a processor coupled to the memory, the processor to:

generate a list comprising a first entry and a second entry, wherein the first entry includes a first identifier of a first mesh network device of a wireless mesh network and a first connectivity indicator of the first mesh network device, and wherein the second entry includes a second identifier of a second mesh network device of the wireless mesh network and a second connectivity indicator of the second mesh network device;

identify a subset of entries that have largest, among all entries, values of the connectivity indicators, wherein the subset includes the first entry and the second entry; and cause a first copy of the digital content item to be stored on the first mesh network device referenced by the first entry.

14. The computer system of claim 13, wherein the first connectivity indicator comprises a number of neighboring mesh network devices that are reachable by the first mesh network device over a single-hop network path.

15. The computer system of claim 13, wherein a number of entries comprised by the subset is equal to a replication factor of the digital content item, wherein the replication factor reflects a ratio of a number of client requests for the digital content item and a number of client requests for a plurality of digital content items stored on mesh network devices of the wireless mesh network.

16. The computer system of claim 13, wherein the processor is further to:

generate a connectivity matrix comprising a plurality of rows, wherein a first row of the plurality of rows is represented by a vector comprising a plurality of elements, wherein a particular element of the plurality of elements comprises a number of network hops on a network path between the first mesh network device and a third mesh network device identified by a position of the particular element in the first row;

determining the first number of the neighboring mesh network devices by counting, in the first row, elements having a value of one.

17. The computer system of claim 13, wherein the processor is further to:

apply a hash function to an identifier of the digital content item to determine a third identifier of a third mesh network device;

cause a second copy of the digital content item to be stored on the third mesh network device.

18. The computer system of claim 13, wherein the processor is further to:

determine that a number of copies of the digital content item that are stored by one or more devices of the wireless mesh network is less than a replication factor of the digital content item;

cause a second copy of the digital content item to be stored on the second mesh network device referenced by the second entry.

19. The computer system of claim 13, wherein to generate the list, the processor is further to:

query the first mesh network device to provide a number of mesh network hops on a network path between the first mesh network device and the second mesh network device.

20. The computer system of claim 13, wherein to identify a subset of entries, the processor is further to:

order the list in a descending order of the connectivity indicators.

* * * * *